United States Patent
Milam et al.

(10) Patent No.: US 9,922,311 B2
(45) Date of Patent: Mar. 20, 2018

(54) ACCOUNT MASK IDENTIFIER APPARATUS, METHOD, AND COMPUTER PROGRAM PRODUCT

(71) Applicant: MasterCard International Incorporated, Purchase, NY (US)

(72) Inventors: Amy C. Milam, Wentzville, MO (US); Stephen J. Klaus, Clayton, MO (US); Mirza S. Zafar, Bridgeton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 593 days.

(21) Appl. No.: 14/209,497

(22) Filed: Mar. 13, 2014

(65) Prior Publication Data

US 2014/0279464 A1    Sep. 18, 2014

Related U.S. Application Data

(60) Provisional application No. 61/798,239, filed on Mar. 15, 2013.

(51) Int. Cl.
| | |
|---|---|
| *G06Q 40/00* | (2012.01) |
| *G06Q 20/10* | (2012.01) |
| *G06Q 20/02* | (2012.01) |
| *G06Q 30/00* | (2012.01) |

(52) U.S. Cl.
CPC ......... *G06Q 20/102* (2013.01); *G06Q 20/023* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 5,699,528 A | 12/1997 | Hogan | |
| 6,385,595 B1 | 5/2002 | Kolling | |
| 7,756,336 B2 | 7/2010 | Napper | |
| 7,917,435 B2 | 3/2011 | Hall | |
| 8,010,541 B2 | 8/2011 | Aggarwal et al. | |
| 8,166,000 B2 | 4/2012 | Labrie | |
| 2005/0222952 A1* | 10/2005 | Garrett | G06Q 20/102 705/40 |

(Continued)

OTHER PUBLICATIONS

Authorized Officer Blaine R. Copenheaver, PCT International Patent Application PCT/USI4/27595, International Search Report and Written Opinion of the ISA/US, pp. 1-12, dated Jul. 29, 2014.

*Primary Examiner* — Paul Danneman
(74) *Attorney, Agent, or Firm* — Otterstedt, Ellenbogen & Kammer, LLP

(57) ABSTRACT

At a computing device, optionally located in communication with an intermediate node in an electronic bill payment system, access is obtained to a data structure including a plurality of valid customer account numbers for customers of a biller that utilizes or desires to utilize the electronic bill presentment and payment system. With the computing device, each character of each of said valid customer account numbers is replaced with a wild card in accordance with a normalization scheme, to obtain a plurality of normalized valid customer account numbers. At least one pattern of said wild cards in said plurality of normalized valid customer account numbers is designated as a recommended account mask.

18 Claims, 22 Drawing Sheets

(56) References Cited

U.S. PATENT DOCUMENTS

| | | |
|---|---|---|
| 2006/0190374 A1* | 8/2006 | Sher .................. G06Q 30/04 705/35 |
| 2008/0046364 A1 | 2/2008 | Hall |
| 2010/0174644 A1 | 7/2010 | Rosano |
| 2011/0251952 A1 | 10/2011 | Kelly |
| 2012/0143897 A1 | 6/2012 | Wei |
| 2012/0197788 A1 | 8/2012 | Sanghvi |
| 2013/0066775 A1 | 3/2013 | Milam |

* cited by examiner

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

9999999991    Biller Name 1    Total Accounts: 20

Total account matches for biller: 0

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Generic Masking Found for 9999999991 - Biller Name 1

| | | | | | |
|---|---|---|---|---|---|
| 9999999991 | Biller Name 1 | 10 | @########@ | 2 | 16% |
| 9999999991 | Biller Name 1 | 10 | @@#######@ | 10 | 83% |
| 9999999991 | Biller Name 1 | 9 | @#####@#@ | 3 | 37% |
| 9999999991 | Biller Name 1 | 9 | @####@@@ | 5 | 62% |

Specific Masking (1st 3 Characters) Found for 9999999991 - Biller Name 1

| | | | | | |
|---|---|---|---|---|---|
| 9999999991 | Biller Name 1 | 10 | A71######@ | 1 | 8% |
| 9999999991 | Biller Name 1 | 10 | AA1######@ | 2 | 16% |
| 9999999991 | Biller Name 1 | 10 | AB1######@ | 1 | 8% |
| 9999999991 | Biller Name 1 | 10 | AC1######@ | 1 | 8% |
| 9999999991 | Biller Name 1 | 10 | BB1######@ | 1 | 8% |
| 9999999991 | Biller Name 1 | 10 | CA1######@ | 1 | 8% |
| 9999999991 | Biller Name 1 | 10 | CC1######@ | 2 | 16% |
| 9999999991 | Biller Name 1 | 10 | DD9######@ | 1 | 8% |
| 9999999991 | Biller Name 1 | 10 | N11######@ | 1 | 8% |
| 9999999991 | Biller Name 1 | 10 | NQ1######@ | 1 | 8% |
| 9999999991 | Biller Name 1 | 9 | A12###@#@ | 1 | 12% |
| 9999999991 | Biller Name 1 | 9 | E67###@#@ | 1 | 12% |
| 9999999991 | Biller Name 1 | 9 | J98###@@@ | 1 | 12% |
| 9999999991 | Biller Name 1 | 9 | M12###@@@ | 1 | 12% |
| 9999999991 | Biller Name 1 | 9 | N98###@#@ | 1 | 12% |
| 9999999991 | Biller Name 1 | 9 | N98###@@@ | 1 | 12% |
| 9999999991 | Biller Name 1 | 9 | Q12###@@@ | 1 | 12% |
| 9999999991 | Biller Name 1 | 9 | X12###@@@ | 1 | 12% |

*FIG. 3A*

Specific Masking (1st 6 Characters) Found for 9999999991 - Biller Name 1

| | | | | | |
|---|---|---|---|---|---|
| 9999999991 | Biller Name 1 | 10 | A71299###@ | 1 | 8% |
| 9999999991 | Biller Name 1 | 10 | AA1222###@ | 1 | 8% |
| 9999999991 | Biller Name 1 | 10 | AA1231###@ | 1 | 8% |
| 9999999991 | Biller Name 1 | 10 | AB1234###@ | 1 | 8% |
| 9999999991 | Biller Name 1 | 10 | AC1298###@ | 1 | 8% |
| 9999999991 | Biller Name 1 | 10 | BB1231###@ | 1 | 8% |
| 9999999991 | Biller Name 1 | 10 | CA1231###@ | 1 | 8% |
| 9999999991 | Biller Name 1 | 10 | CC1231###@ | 1 | 8% |
| 9999999991 | Biller Name 1 | 10 | CC1298###@ | 1 | 8% |
| 9999999991 | Biller Name 1 | 10 | DD9998###@ | 1 | 8% |
| 9999999991 | Biller Name 1 | 10 | N11233###@ | 1 | 8% |
| 9999999991 | Biller Name 1 | 10 | NQ1233###@ | 1 | 8% |
| 9999999991 | Biller Name 1 | 9 | A12345@#@ | 1 | 12% |
| 9999999991 | Biller Name 1 | 9 | E67890@#@ | 1 | 12% |
| 9999999991 | Biller Name 1 | 9 | J98888@@@ | 1 | 12% |
| 9999999991 | Biller Name 1 | 9 | M12312@@@ | 1 | 12% |
| 9999999991 | Biller Name 1 | 9 | N98765@@@ | 1 | 12% |
| 9999999991 | Biller Name 1 | 9 | N98766@#@ | 1 | 12% |
| 9999999991 | Biller Name 1 | 9 | Q12321@@@ | 1 | 12% |
| 9999999991 | Biller Name 1 | 9 | X12343@@@ | 1 | 12% |

*************************************************

9999999992   Biller Name 2   Total Accounts: 20

Total account matches for biller: 0

*************************************************

Generic Masking Found for 9999999992 - Biller Name 2

| | | | | | |
|---|---|---|---|---|---|
| 9999999992 | Biller Name 2 | 10 | @#######@ | 2 | 16% |
| 9999999992 | Biller Name 2 | 10 | @@######@ | 10 | 83% |
| 9999999992 | Biller Name 2 | 9 | @#####@#@ | 3 | 37% |
| 9999999992 | Biller Name 2 | 9 | @####@@@ | 5 | 62% |

*FIG. 3B*

Specific Masking (1st 3 Characters) Found for 9999999992 - Biller Name 2

| | | | | | |
|---|---|---|---|---|---|
| 9999999992 | Biller Name 2 | 10 | A71#####@ | 1 | 8% |
| 9999999992 | Biller Name 2 | 10 | AA1#####@ | 2 | 16% |
| 9999999992 | Biller Name 2 | 10 | AB1#####@ | 1 | 8% |
| 9999999992 | Biller Name 2 | 10 | AC1#####@ | 1 | 8% |
| 9999999992 | Biller Name 2 | 10 | BB1#####@ | 1 | 8% |
| 9999999992 | Biller Name 2 | 10 | CA1#####@ | 1 | 8% |
| 9999999992 | Biller Name 2 | 10 | CC1#####@ | 2 | 16% |
| 9999999992 | Biller Name 2 | 10 | DD9#####@ | 1 | 8% |
| 9999999992 | Biller Name 2 | 10 | N11#####@ | 1 | 8% |
| 9999999992 | Biller Name 2 | 10 | NQ1#####@ | 1 | 8% |
| 9999999992 | Biller Name 2 | 9 | A12###@#@ | 1 | 12% |
| 9999999992 | Biller Name 2 | 9 | E67###@#@ | 1 | 12% |
| 9999999992 | Biller Name 2 | 9 | J98###@@@ | 1 | 12% |
| 9999999992 | Biller Name 2 | 9 | M12###@@@ | 1 | 12% |
| 9999999992 | Biller Name 2 | 9 | N98###@#@ | 1 | 12% |
| 9999999992 | Biller Name 2 | 9 | N98###@@@ | 1 | 12% |
| 9999999992 | Biller Name 2 | 9 | Q12###@@@ | 1 | 12% |
| 9999999992 | Biller Name 2 | 9 | X12###@@@ | 1 | 12% |

Specific Masking (1st 6 Characters) Found for 9999999992 - Biller Name 2

| | | | | | |
|---|---|---|---|---|---|
| 9999999992 | Biller Name 2 | 10 | A71299###@ | 1 | 8% |
| 9999999992 | Biller Name 2 | 10 | AA1222###@ | 1 | 8% |
| 9999999992 | Biller Name 2 | 10 | AA1231###@ | 1 | 8% |
| 9999999992 | Biller Name 2 | 10 | AB1234###@ | 1 | 8% |
| 9999999992 | Biller Name 2 | 10 | AC1298###@ | 1 | 8% |
| 9999999992 | Biller Name 2 | 10 | BB1231###@ | 1 | 8% |
| 9999999992 | Biller Name 2 | 10 | CA1231###@ | 1 | 8% |
| 9999999992 | Biller Name 2 | 10 | CC1231###@ | 1 | 8% |
| 9999999992 | Biller Name 2 | 10 | CC1298###@ | 1 | 8% |
| 9999999992 | Biller Name 2 | 10 | DD9998###@ | 1 | 8% |
| 9999999992 | Biller Name 2 | 10 | N11233###@ | 1 | 8% |
| 9999999992 | Biller Name 2 | 10 | NQ1233###@ | 1 | 8% |
| 9999999992 | Biller Name 2 | 9 | A12345@#@ | 1 | 12% |
| 9999999992 | Biller Name 2 | 9 | E67890@#@ | 1 | 12% |
| 9999999992 | Biller Name 2 | 9 | J98888@@@ | 1 | 12% |
| 9999999992 | Biller Name 2 | 9 | M12312@@@ | 1 | 12% |
| 9999999992 | Biller Name 2 | 9 | N98765@@@ | 1 | 12% |
| 9999999992 | Biller Name 2 | 9 | N98766@#@ | 1 | 12% |
| 9999999992 | Biller Name 2 | 9 | Q12321@@@ | 1 | 12% |
| 9999999992 | Biller Name 2 | 9 | X12343@@@ | 1 | 12% |

*FIG. 3C*

| | |
|---|---|
| Billers(12389) × Biller TRAINING-Water* × | ~8001 |

| | Current Value |
|---|---|
| RPPS ID * | 55200005 |
| Concentrator Name | TRAINING-Waters 5 Concentrator |
| Biller ID * | 5520000013 | ~8003
| Biller Name * | TRAINING-Water Valley Insurance Portland | ~8005
| Previous Biller Name | |
| Line Of Business * | Remote Banking (US) |
| Batch Name * | TRAINING DATA |
| Organization Name | |
| Class * | Insurance |
| Biller Type * | Core |
| Product Code * | 001 |

| Mask | Len. | Indicator | Status |
|------|------|-----------|--------|
| #### | 4 | Standard | Active |
| HO###### | 7 | Standard | Active |
| AI######## | 10 | Standard | Active |
| EEEE#######-### | 14 | Standard | Active |

8009 (brace covering Indicator and Status columns)

Tabs: General, Remittance, Masks, AKA, Contacts, Check Digit, ... Value Ad
Biller: TRAINING-Water1
Billers(1989)
Masks | Approved Changes
Search | Clear Search | View ▼

FIG. 9B
PRIOR ART

```
101 5520000053 9999000041303110201019410TRAINING-WATERS 5 COMCENTRATO REMIT PROC CENT SITERECY
5200TRAINING-TOMORROW TREASURES 8003B✓ 5520000013 CIERPS PAYMNT        130311    1000000000000700001
6200000000131000040001         000000300SANCHEZ, MILAGR    9795237            MC002438657086233
6200000000131000040001         000001000BODINE, WILLIAM    0794122            MC002438657086233
6200000000131000040001         000002500SIDENER, KIMBER    7408677            MC002438657086233
6200000000131000040001         000002500GROVER, MORGAN     2400360            MC002438657086233
```

*FIG. 9D*
PRIOR ART

LEGEND FOR MASKS:
* = UPPERCASE ALPHA
# = NUMERIC
@ = UPPERCASE ALPHA OR NUMERIC
! = SPECIAL CHARACTERS, UPPER AND LOWERCASE ALPHA OR NUMERIC

*FIG. 10*

ACCOUNT MASK IDENTIFIER APPARATUS, METHOD, AND COMPUTER PROGRAM PRODUCT

CROSS-REFERENCE TO RELATED APPLICATIONS

This patent application claims the benefit of U.S. Provisional Patent Application Ser. No. 61/798,239 filed on 15 Mar. 2013 and entitled "ACCOUNT MASK IDENTIFIER APPARATUS, METHOD, AND COMPUTER PROGRAM PRODUCT." The complete disclosure of the aforementioned U.S. Provisional Patent Application Ser. No. 61/798, 239 including all appendices thereof is expressly incorporated herein by reference in its entirety for all purposes.

FIELD OF THE INVENTION

The present invention relates generally to the electronic and computer arts, and, more particularly, to electronic payment techniques.

BACKGROUND OF THE INVENTION

U.S. Pat. No. 5,699,528 to Hogan (expressly incorporated herein by reference in its entirety for all purposes) discloses a system and method for bill delivery and payment over a communications network. In the bill delivery and payment system, users are able to access a server computer on a communications network to obtain bill information and pay bills. For example, such a communications network may be the Internet or the World Wide Web thereof. Using a personal computer, a user can access a Web site provided by the server computer to view the bill information and instruct the server computer as to the details of the bill payment. In a second embodiment, without visiting the web site, users are provided with electronic bills containing bill information in the form of electronic mail (e-mail) at their e-mail addresses. After opening an electronic bill, a user can make the bill payment by replying to the electronic bill.

Electronic bill presentment and payment has become widespread, and is more efficient, less costly, and more environmentally friendly than paper-based techniques.

SUMMARY OF THE INVENTION

Principles of the present invention provide techniques for an account mask identifier apparatus, method, and computer program product. At least some aspects of the techniques may be facilitated by the operator of an electronic bill presentment and payment system (BPPS) or other service provider.

Aspects of the invention contemplate method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. The means are expressly defined to exclude disembodied signals per se or transmission media per se.

One or more embodiments of the invention can provide substantial beneficial technical effects, including:
  enhanced security as compared to paper-based transactions or informal transfer of a possibly non-encrypted file;
  less environmental impact as compared to paper-based transactions;
  reducing false negatives in the processing of bills and thereby improving the processing efficiency—this advantageously ties in with a faster user experience.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3A-3C depict exemplary output data, in accordance with an aspect of the invention;

FIGS. 8A-8C show an exemplary biller profile, as known per se from the prior art, in connection with which one or more embodiments can be employed;

Figure 9B:
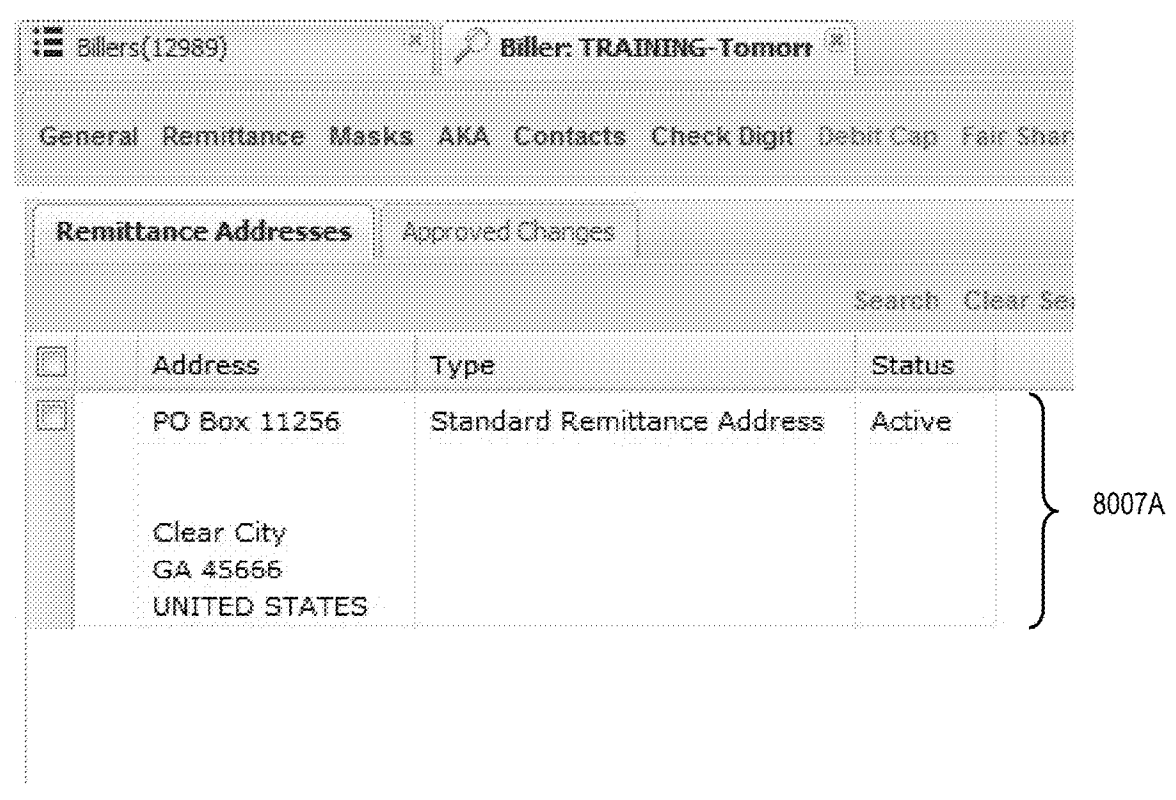

FIGS. 9A-9D show an exemplary biller profile, as known per se from the prior art, in connection with which one or more embodiments can be employed;

FIG. 10 shows an exemplary legend for account masks, in accordance with an aspect of the invention;

DETAILED DESCRIPTION OF PREFERRED EMBODIMENTS

Inventive techniques can be employed in a number of different environments. In one or more embodiments, inventive techniques can be employed in connection with an electronic bill presentment and payment system (BPPS), a non-limiting example of which is the MASTERCARD RPPS® electronic payment system of MasterCard International Incorporated of Purchase, N.Y., USA. Furthermore, one or more embodiments can be used in connection with a pure electronic bill payment system that does not include presentment functionality. References herein to a BPPS are exemplary and are not intended to limit the scope of the invention to use with a system that includes presentment functionality, unless presentment functionality is expressly recited in a particular claim. Some embodiments could be employed in connection with a system such as that disclosed in United States Patent Publication No. 2012-0197788 A1 of Hemal Sanghvi et al., TRANSACTION PROCESSING ENGINE FOR BILL PAYMENT TRANSACTIONS AND THE LIKE, the complete disclosure of which is expressly incorporated herein by reference in its entirety for all purposes.

For the avoidance of doubt, references to MasterCard, unless expressly stated to be limited to MasterCard, are intended to be exemplary of an operator of an electronic bill payment system and/or an operator of a payment network, whether or not qualified by words such as "or other operator."

Figure 1:
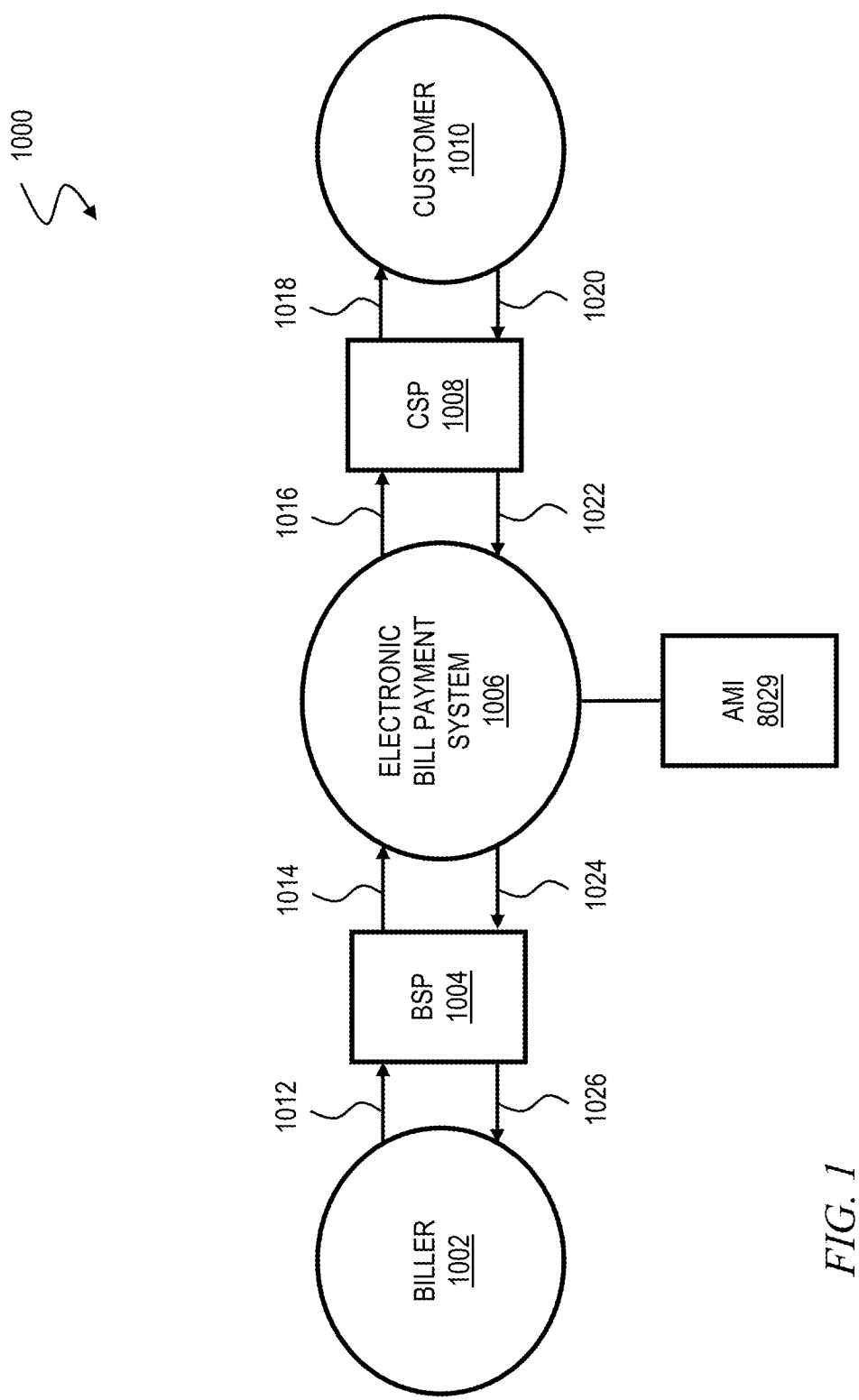
FIG. 1 shows exemplary operation of a bill pay system with an account mask identifier tool in accordance with an aspect of the invention.

FIG. 1 shows operation of a current electronic bill payment system, such as the MASTERCARD RPPS® electronic payment system, which is but one non-limiting example of such a system. Given the teachings herein, the skilled artisan will be able to implement one or more embodiments of the invention using a variety of techniques; by way of example and not limitation, the modification or supplementing of an existing system such as that shown in FIG. 1 using techniques described herein. As shown in FIG. 1, in a current approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Figure 2:
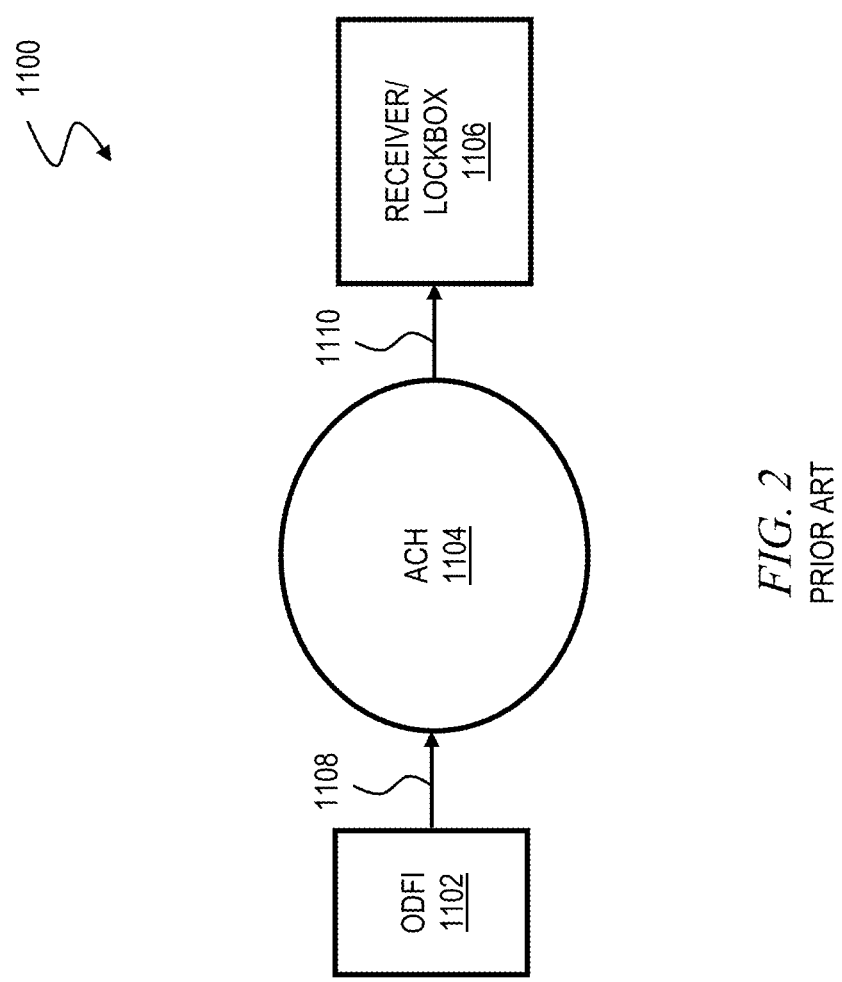
FIG. 2 shows exemplary operation of current automated clearinghouse payments.

FIG. 2 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; one non-limiting example of an ACH file format is the NACHA ACH CCD file format. Other formats can also be used; for example, extensible markup language (XML). It should be noted that a variety of networks can be used, both public (for example, ACH) and proprietary (for example, the aforementioned MASTERCARD RPPS system).

Figure 8B:
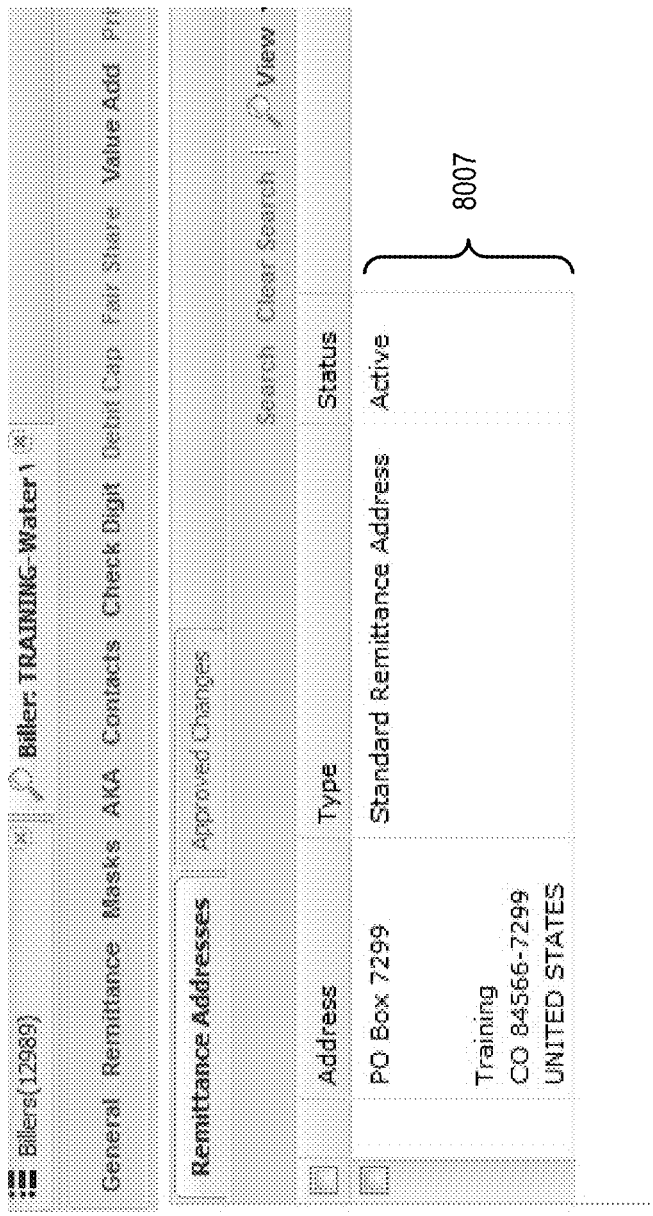
Figure 9A:
Figure 9C:
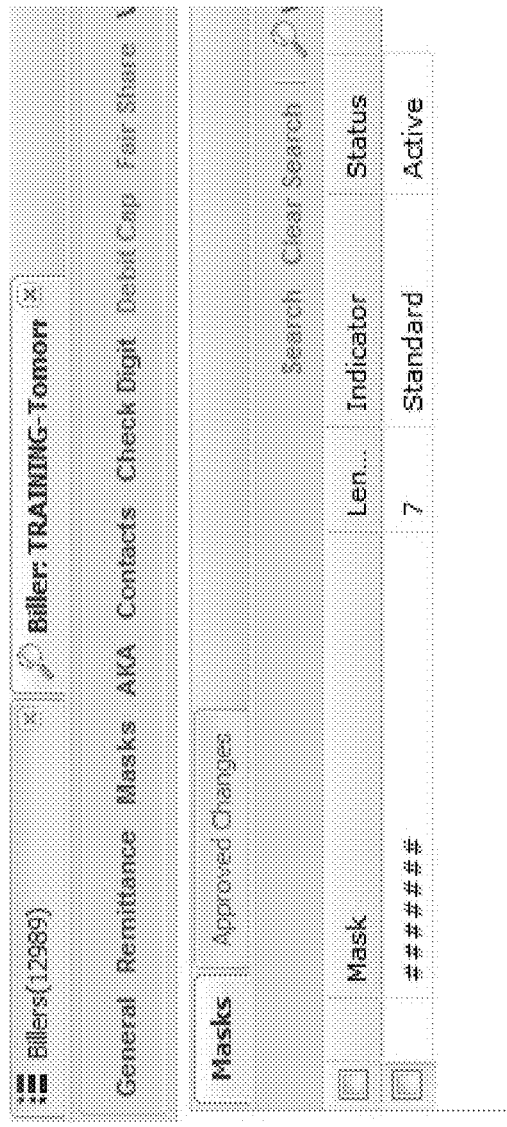

Referring now to FIGS. 8A-8C, a biller directory is a database which identifies billers who are participating in an electronic bill presentment and/or payment system. Billers with a biller profile 8001 can receive payments electronically. Each biller may have one or more profiles. In a non-limiting example, a biller directory may include profiles of more than ten thousand billers set up to receive bill payment transactions via the MASTERCARD RPPS network. In general, billers can have one or more profiles 8001. For each biller profile 8001, a biller ID 8003 and the biller's bill payment information are provided (biller name 8005, also known as (AKA), remittance address(es) 8007, account mask(s) 8009, and contact information (contact information is omitted from the figure to avoid clutter)). Note also the following items which will be familiar to the skilled artisan: Live Date, Participant Internal ID, Biller Type, an indication whether the biller is a private biller, an indication whether the biller accepts guaranteed payments only, and notes. Information in the biller directory can be used by financial institutions that want to route bill payments electronically through a bill presentment and/or payment system. Such institutions seek to leverage data to determine whether the biller is in the directory, and if so, whether consumer-provided information regarding payments matches information in the biller profile.

Account masks 8009 identify what the account structure looks like for payments that process to the particular biller in question. The mask is "clean" and shows how the biller desires to receive payments. Furthermore in this regard, the mask identifies the account structure format needed by the biller to post the transaction automatically. If the account number provided by the consumer does not fit the mask identified by the biller, the payment will be rejected by the BPPS. The mask drives edits against the account number. Billers desire to receive payments that have been validated against their masks—hence the terminology 'clean.'

If the payment does not meet the criteria set forth in the account mask, it is rejected and not passed along to the biller. Account masking is important because it identifies messages that should not be passed. Originating financial institutions will determine, for example, that if account numbers for Training Water Valley Insurance start with an "MO," such payments will not be routed ab initio because they do not match the mask(s) (i.e., they do not start with numerals, HO, AI or EEEE as seen at 8009 in FIG. 8C) and so will be stopped by the bill payment network if not stopped by the originating financial institution. Thus, in one or more embodiments, a front end of the originating financial institution (OFI) (8021 in FIG. 11) can utilize an account mask for initial filtering. OFI 8021 may be, but need not be, an ODFI 1102. The ODFI referenced in 1102 is a financial institution connected to the ACH network. BPPS originators may or may not be financial institutions (the majority typically are). It is likely that an ODFI connected to the ACH could also be an originator sending payments directly into the BPPS network. In one or more embodiments, the originator is not a consumer, it an organization that is sending bill payments into the BPPS network—typically banks, and walk in payment providers, who want to send bill payments to a biller electronically.

Once the OFI has identified a biller that it wants to route payments to, the OFI will capture the biller identifier, shown at 8003A, 8003B in FIGS. 9A-9D. The OFI will be given sufficient information as to how to route the payment. The account mask helps the OFI to find the correct biller. In particular, and by way of provision of additional detail, in one or more embodiments, during payment processing, a determination is made whether the Biller ID 8003B identified in the batch record is valid and active (by comparison to Biller ID 8003A in the profile. A further determination is made as to whether the consumer's account number passes the account masks established for identified Biller ID. If so, the OFI sends same to the receiver and/or biller; if not, the OFI rejects same and sends same back to the originator. Payments are routed to the Biller ID as established in the participants' parameters.

Furthermore in this regard, the OFI may determine if the account number provided by the consumer will pass or not (based upon account masks provided by the biller). If the OFI determines the account number will reject, BPPS would not see the transaction. It would drop to paper check. The OFI identifies in the bill payment file to BPPS what Biller ID to route the payment. The bill payment network receives the bill file and applies account mask edits as identified by the biller in the biller's profile. If account mask edits are successfully the bill payments are sent to the biller. If the account mask edits are rejected, the reject details are sent back to the OFI, the biller will not receive or see this. Thus, attempted payments with an incorrect account number may be intercepted at the OFI or BPPS level.

In FIGS. 9A-9D, note also Biller Name 8005A, remittance address 8007A, unnumbered additional fields similar to those described with respect to FIG. 8, as well as a "Previous Name" field and a number of "also known as" (AKA) names which will be familiar to the skilled artisan.

In one or more embodiments, originators take the biller's profile from the biller directory and incorporate it into their systems. Some originators carry this process out manually; others use an automated process. Some originators also have matching logic in their systems, which logic attempts to take the consumer's bill payment instructions, find the biller in the biller directory, and determine routing based upon same. In one or more embodiments, biller directory files are the primary communication vehicle for originators to know what billers are participating in the BPPS network—adds, updated, deletes. The biller directory files may be downloaded into the OFI bill payment system for matching and routing decisioning. When creating payment files, the originator identifies the Biller ID to which the bill payment is to be routed. Missing account masks are disadvantageous, as the expected result of same is that payments will not be processed electronically through an electronic bill payment system; that is to say, there is reduced efficiency for the operator of the payment system. It is beneficial for the entire market (OFIs and billers) to receive bill payments electronically as compared to paper check payments due to the higher cost, manual intervention, check clearing, DSO for billers A/R, etc. Thus, it is desirable to have all account masks represented; if the account mask is not present, most originators will not send the payment, knowing it will be rejected.

Thus, the originator, i.e., the financial institution that wants to route the payment, is dependent on the data in the biller directory. Such data should be clean, robust, and up to date. On the other end of the process are the billers or receivers that are maintaining the biller profiles. Some banks may have two hundred billers and may be responsible for keeping all the information up to date. One or more embodiments seek to assist with this updating process. It has been found, when receivers work with billers, that some billers are fairly sophisticated and know what their account structure is. However, many billers are unfamiliar with their account structures, due to lack of sophistication and/or recent migration, merger and acquisition, or the like (in the latter case, for example, there may be unfamiliarity with the account structures of the newly-acquired entity). One or more embodiments seek to assist those tasked with managing the biller profiles to keep the information updated and ensure that no account masks are missed.

In one or more embodiments, receivers are provided with an online tool for administering billers, including adding billers (e.g., setting up new biller profiles); and for managing existing billers including updates and deletes (e.g., for account masks, AKAs, remittance addresses, and/or contact information).

Account masking advantageously drives edits against the account number, thus providing clean payments to the billers. The biller directory thus advantageously results in clean payments which conform to established account masks. One or more embodiments advantageously assist receivers and/or billers in identifying what the account mask should be. One or more embodiments advantageously assist in situations wherein, heretofore, account masks have not matched listings on the consumer's bill statement.

By way of a non-limiting example, suppose Mary Doe's ACME Insurance bill shows that Mary's account number is 1234567 03/13; however, the true account number is 1234567, the 03/13 is the policy start date and ACME cannot receive 03/13 in its A/R posting file. By way of another non-limiting example, suppose Sallie Mae (SLM Corporation (commonly known as Sallie Mae; originally the Student Loan Marketing Association)) presents John Smith's loan account number as F-987654-001 so that is how John sets it up in online bill payment. However, Sallie Mae needs the "F and -001" removed from the account number in order to receive it and post it electronically from BPPS. These are examples of cases where the biller requires a change in order to post automatically.

Furthermore, one or more embodiments facilitate more rapid updating of account masks. Even further, one or more embodiments are helpful with insurance bills, which may otherwise be confusing because the policy number may be confused with the account number.

FIG. 10 shows a non-limiting exemplary legend used for account masks. As seen therein, an asterisk represents an uppercase letter, a pound or hash sign represents a numeral, an "at" sign represents an uppercase letter or a numeral, and an exclamation point represents a complete wild card, i.e., it can correspond to a special character, an upper or lower case letter, or a numeral.

As a general rule, masks should be developed not only to reject bad payments but also to pass good payments.

Advantageously, one or more embodiments provide pattern recognition functionality such that a biller or a biller's receiver can upload all their valid account numbers (i.e., account numbers that can be routed electronically to a biller); the system then analyzes same and provides one or more recommended account masks that should be implemented based on the provided list of valid account numbers.

One or more embodiments advantageously provide generic account masks and/or refined account masks, to meet customer requirements. For example, suppose an insurance company states that all their account numbers are twelve digits, all of which are numeric. Referring back to FIG. 10, the account mask in such a case could simply be twelve pound or hash signs: ############. Suppose it is noticed that 90% of all the insurance company's account numbers begin with "123." This could lead to a refined account mask wherein the mask is: 123#########.

One or more embodiments advantageously facilitate receivers and billers identifying account masks recommended for the account numbers the receivers and/or billers provide. In one or more embodiments, the tool can be utilized by the BPPS, receiver(s), biller(s), or even OFIs. One or more embodiments provide a standardized approach for establishing account masks. For example, in some instances, best practices may dictate providing both a generic and a refined account mask. Some embodiments identify not merely recommended account masks but also the number of accounts that will meet each of the recommended masks. One or more embodiments can be used in conjunction with existing techniques, such as Account Conversion Technology (see U.S. Pat. No. 7,917,435 and US Patent Publication 2010-0174644 A1), Stop File, and Payments Maximizer (see, e.g., US Patent Publication US 2013-0066775 A1 of Amy C. Milam, expressly incorporated herein by reference in its entirety for all purposes). Furthermore, one or more embodiments advantageously improve upon processes which have heretofore been performed manually, such as analyzing cleansed scrub files via an automated process and/or providing an optimization framework for reviewing bill payment data provided by originators.

Thus, one or more embodiments advantageously reduce the amount of menial intervention required by billers and receivers to identify missing account masks needed so as to have a set of account masks that will pass all valid account numbers.

US Patent Publication US 2013-0066775 A1 discloses an ABU/ACT materialized table; this refers to the Automatic Billing Updater, a product offered by MasterCard International Incorporated of Purchase, N.Y., USA. See U.S. Pat. No. 7,917,435 and US Patent Publication 2010-0174644. This product includes helpful tables correlating old and new account numbers (e.g., for payment card accounts) when an account restructuring has taken place.

Figure 4:
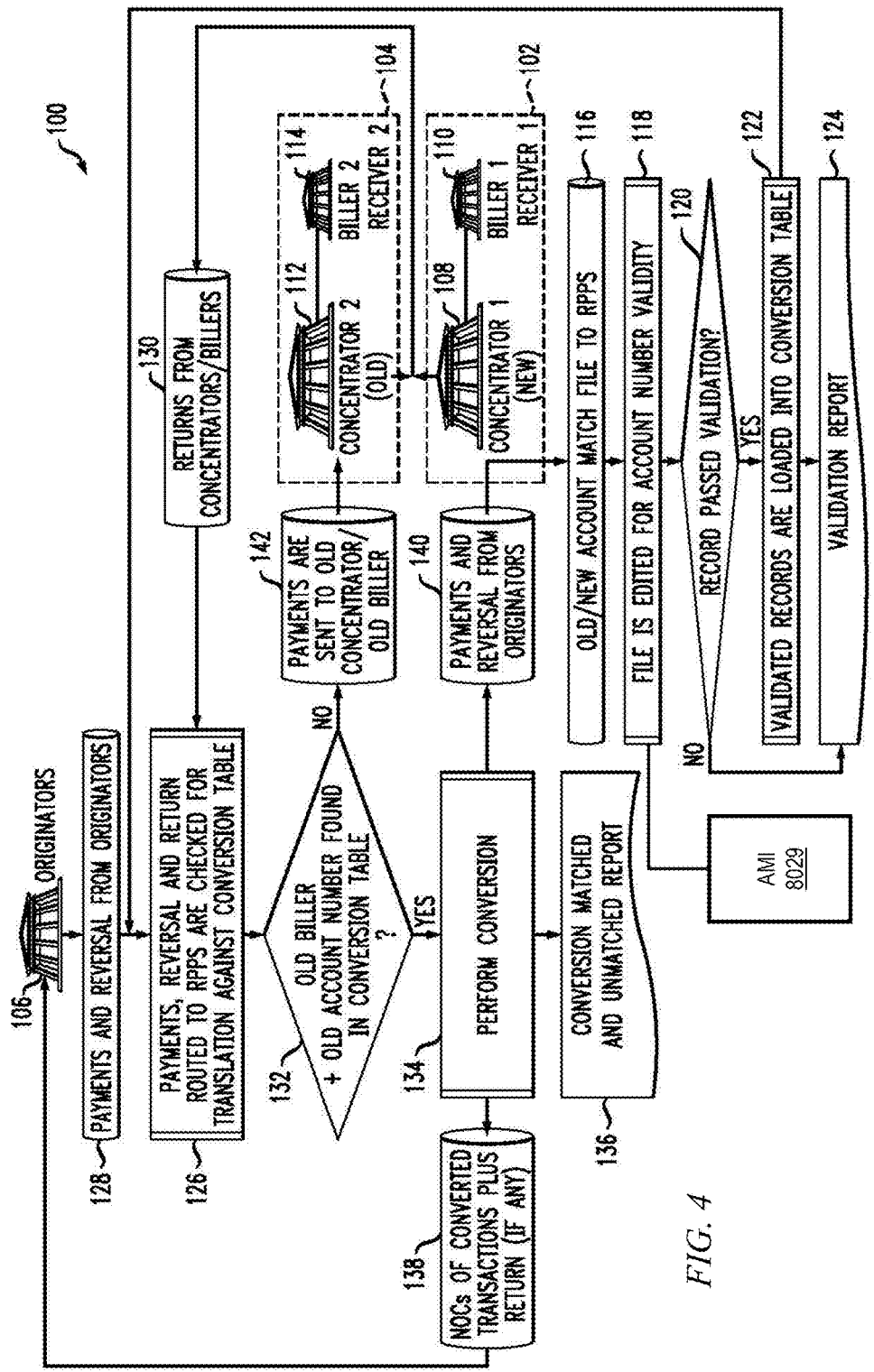
FIG. 4 shows a flow chart exemplary of techniques for account restructuring, as known from U.S. Pat. No. 7,917, 435 of Gidget A. Hall et al., APPARATUS AND METHOD FOR FACILITATING ACCOUNT RESTRUCTURING IN AN ELECTRONIC BILL PAYMENT SYSTEM, and from US Patent Publication 2010-0174644 A1 of Sharon A. Rosano et al., Integrated File Structure Useful in Connection with Apparatus and Method for Facilitating Account Restructuring in an Electronic Bill Payment System, the complete disclosures of both of which are expressly incorporated herein by reference in their entireties for all purposes, updated in accordance with aspects of the invention.

In FIG. 4, in element 118, if an account has rejected and is not loaded into the tables because the account number is not passing an existing account mask, an account mask identifier tool 8029, discussed below, could automatically notify an operations team or the biller profile administrator that an account mask needs to be added to support the rejected account numbers that need to be reloaded into the tables. In flow chart 100 of FIG. 4, note a plurality of receivers 102, 104 (only two are shown for purposes of illustrative convenience) and a plurality of originators 106 (shown as a single block for illustrative convenience). The first receiver 102 can include concentrator 108 and biller 110, while the second receiver 104 can include concentrator 112 and biller 114. Billers 110, 114 may each have a biller identifier (biller ID). In step 116, obtain a data file indicative of an account restructuring of a given one of the receivers 102. The data file specifies at least one old account number associated with the receiver and at least one new account number associated with the receiver (there could be, for example, more than one new account number associated with the receiver). The method can also include placing the old and new account numbers of the receiver in a conversion data structure in a format to facilitate account number conversion, as at step 122 (the data structure can be, for example, a conversion table). Further, the method can include obtaining remittance data 128, 130 from a given one of the participating entities.

The method can include the additional step of checking the data file, for example, by carrying out steps 118 and 120. Step 118 can include, for example, running a check digit routine against the old and new account numbers, and/or verifying account masks for the old and new account numbers. Step 120 can include determining whether the data filed passed the check digit routine and the verifying account masks step. In another optional step 124, a validation report can be generated. Such report could be maintained in house by an entity performing the conversion, or could be given to the receiver automatically or upon request of the receiver. Step 124 can be conducted if a record from a data file fails validation, as shown at the "N" branch of decision block 120, and if desired, can also be performed if the record passes validation, as shown by the side arrow from block 122. As shown at block 138, the method can also include the additional step of preparing a notice of change of a converted transaction for the originator.

A routing step can include, for example, checking the remittance data, as at 126 to determine, as at 132, whether the old account number of the receiver or the new account number of the receiver, as the case may be, is contained in the data structure. Further, routing can include performing conversion as at block 134. This can include, e.g., identifying the payment remittance data as destined for the new account number of the receiver (where remittance data has old number) or the old account number of the receiver (where remittance data has new number), responsive to the old account number of the receiver being contained in the data structure in association with the new account number of the receiver, or the new account number of the receiver being contained in the data structure in association with the old account number of the receiver. By way of explanation, for a payment and/or reversal 128 from an originator, the old account number could be converted to the new account number, with routing to the correct receiver account as at block 140, while for a return 130 from a receiver, the new account number could be converted back to the old account number for routing back to the originator as at block 138, to avoid confusing the originator when the return is received. Note that if the old biller ID and old account number are not found in the table, as at the "N" branch of block 132, the payment and/or reversal is simply sent to the usual ("old") receiver as at block 142. Similarly, returns with no conversion data in the table can simply be processed in the usual way. As shown at block 136, an additional optional step can include preparing a conversion matched and unmatched report, based steps such as 132 and/or 134.

Figure 5:
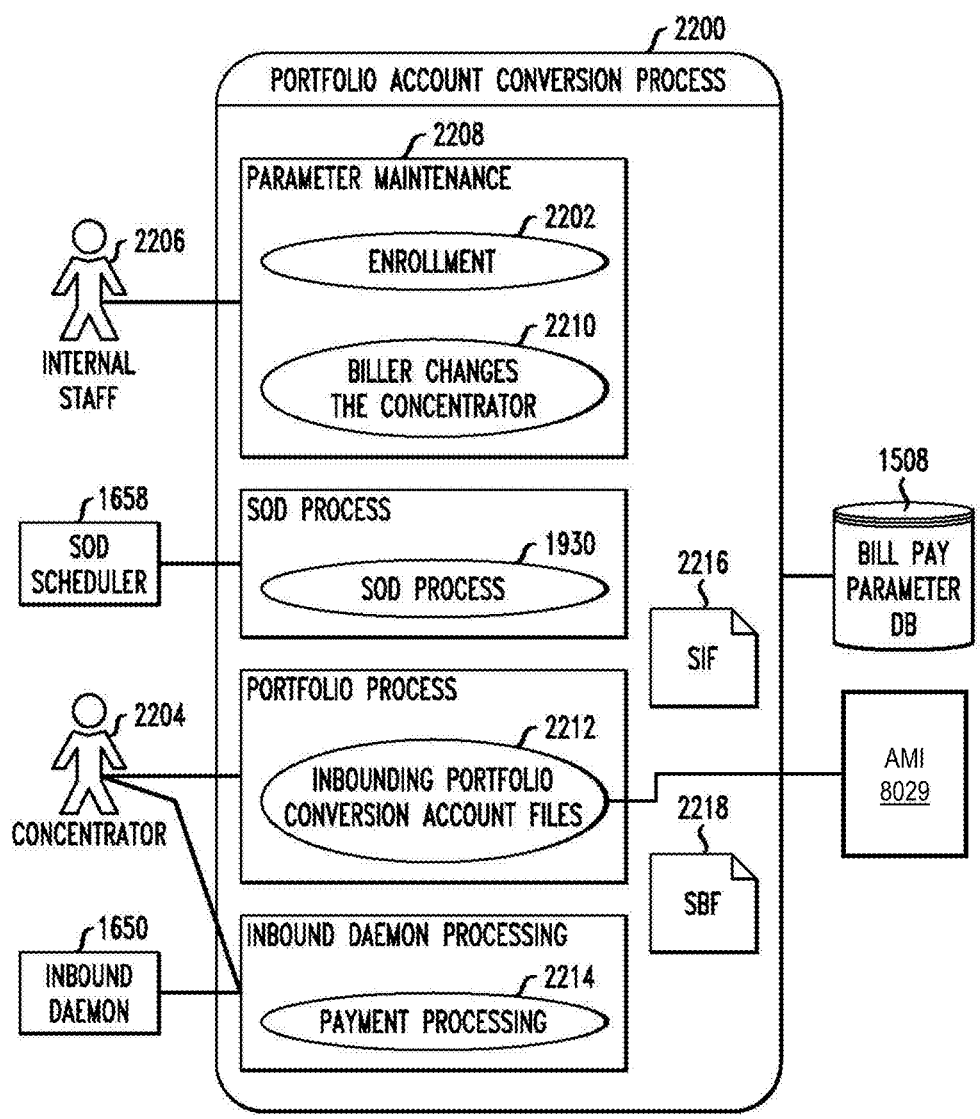
FIG. 5 depicts an exemplary portfolio conversion process, as known from US Patent Publication 2011-0251952 A1 of Mary L. Kelly et al., APPARATUS AND METHOD FOR BILL PRESENTMENT AND PAYMENT, the complete disclosure of which is expressly incorporated herein by reference in its entirety for all purposes, updated in accordance with aspects of the invention.
Figure 6:
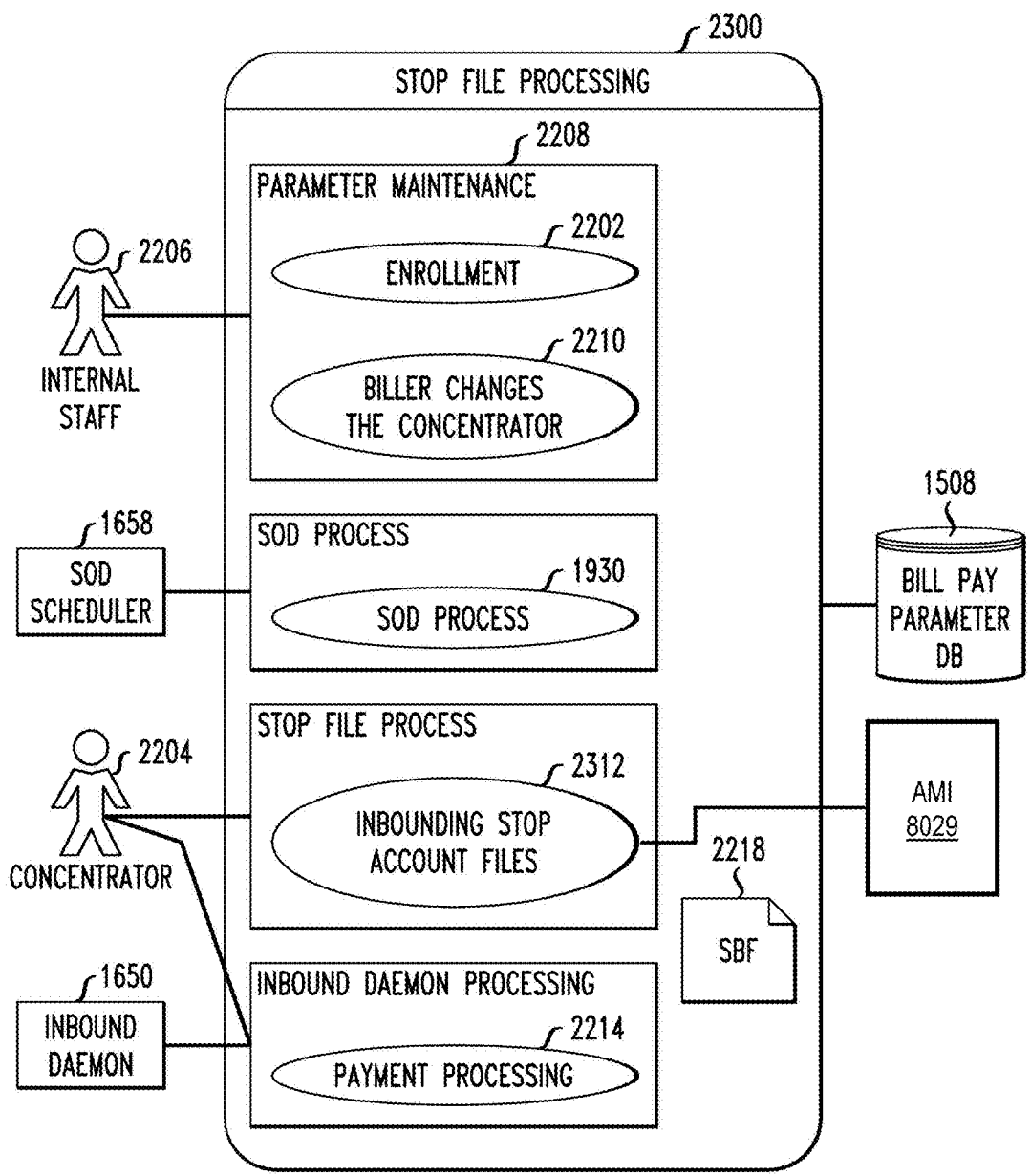
FIG. 6 depicts an exemplary stop file workstream, as known from the aforesaid US Patent Publication 2011-0251952 A1, updated in accordance with aspects of the invention.

In FIGS. 5 and 6, tool 8029 could be incorporated into the 'inbounding portfolio conversion account files and inbounding stop account files' steps 2212, 2312. The tool 8029, in some instances, would not directly reflect payment processing in 2214 (on both figures). FIG. 5 presents a high level flow diagram for an exemplary portfolio conversion process 2200. During enrollment 2202, the concentrators 2204 and/or biller will provide the information to product support 2206 to register and/or enroll a biller for the service; this can be done, for example, in the parameter maintenance 2208. Where the biller changes the concentrator, as at 2210, portfolio conversion is set up between the old biller and/or concentrator and new biller and/or concentrator, with a service payer that is either the old or new biller, and with a start date. In this process, if any of the information changes, then the existing relationship should preferably be inactivated and a new one should be set up. In the start of the day (SOD) process 1930, for all portfolio account conversion file registrations that have a start date of today, set the registration to active and for all portfolio account conversion file registrations that have an end date of today, set the registration to inactive. In the portfolio account conversion process 2212, the details of portfolio account conversion files are validated and uploaded in the data base 1508. During the payment processing 2214, in some cases, apply additional business rule to the standard payment transaction to identify the concentrator(s) and/or biller(s) registered for portfolio account conversion. With regard to SIF 2216, in some cases, the SIF file creation process considers the RPPS ID/ICA details of the new biller and/or concentrator for converted transactions. With regard to SBF 2218, in some cases, during the SBF process 2218, monthly fee, file upload fee, account upload fee and portfolio conversion transaction fee are maintained in bill pay at the biller enrollment level. Note inbound daemon processor 1650 which reads the messages from the request queue, processes the data and persists to the database; scheduler daemon processor 1658 that wakes up at intervals and checks the task list table to see if there are any tasks to be done immediately; and bill pay relational database 1508.

Note that useful information on portfolio conversion can be found in US Patent Publications US 2008-0046364 A1 of Hall et al. and US 2010-0174644 A1 of Rosano et al.

FIG. 6 presents a high level flow diagram for an exemplary stop file work stream 2300. During enrollment 2202, the concentrators and/or biller will provide the information to product support 2206 to register and/or enroll a biller for the service and this will be done in the parameter maintenance 2208. In bock 2210, the biller changes the concentrator; in this process, if the biller and/or concentrator or the start date changes, then the existing relationship should be inactivated and a new one should be set up. During the SOD process 1930, for all stop file registrations that have a start date of today, set the registration to active and for all stop file registrations that have an end date of today, set the registration to inactive. During the Inbounding stop account files block 2312, the details of stop account files will be validated and uploaded in the data base 1508. During payment processing 2214, apply additional business rules to the standard payment transaction to identify the concentrator and/or biller registered for stop file service. During the SBF process 2218, monthly fee, account upload fee and stop file transaction fee are maintained in bill pay at biller enrollment level. Aspects 1658, 2204, 1650, and 1508 are described above.

In some cases, if it is determined that a significant number of payments are being dropped to paper (i.e., cannot be processed electronically and thus must be handled in paper form) for a given biller, the data for the dropped payments can be extracted and run through the account mask identifier tool 8029, discussed below, to recommend a suitable account mask that would catch the payments being dropped. In another example, a bank might note a significant number of problems with payments intended for a given biller. The corresponding data may be sent in a file to the bill payment system operator, who in turn forwards it to the biller in question to try to determine what is wrong. Heretofore in such instances, it has often been noted that when the biller provides corrected account numbers, there is not a suitable account mask that passes those corrected account numbers.

In some cases, as part of a scrubbing process, corrected account numbers provided by receivers and/or billers are verified to ensure that they will pass existing account masks. If not, new account mask(s) that are needed to pass them are identified. In some cases, as part of an optimization aspect, an automatic search is carried out to identify billers that are on the originator's paper biller list, to identify needed biller account masks.

As noted, some embodiments can be used in conjunction with Account Conversion Technology (ACT). In such cases, in some instances, an identification process can be undertaken for account masks that are needed for account numbers that rejected for failing account masks during the account number load process for the identified biller. Furthermore in this regard, when a biller or receiver desires to participate in ACT, the biller or receiver typically provides the BPPS operator with a list of accounts, including the old account number and the new account number. When this information is loaded into the system, a check can be run against the current account masks set up for the particular biller(s). If an attempt is made to load an account number that does not pass the mask process, or for which a mask is missing, the account rejects. One or more embodiments employ one or more techniques described herein to develop appropriate masks such that correct account numbers in the ACT conversion file pass the account mask process.

It is worth noting that if the originator has multiple channels for routing payments, a part of the routing decisioning may include who (i.e., which channel) has a more generic or more specific account mask for the identified biller. One or more embodiments are capable of providing both.

Figure 11:
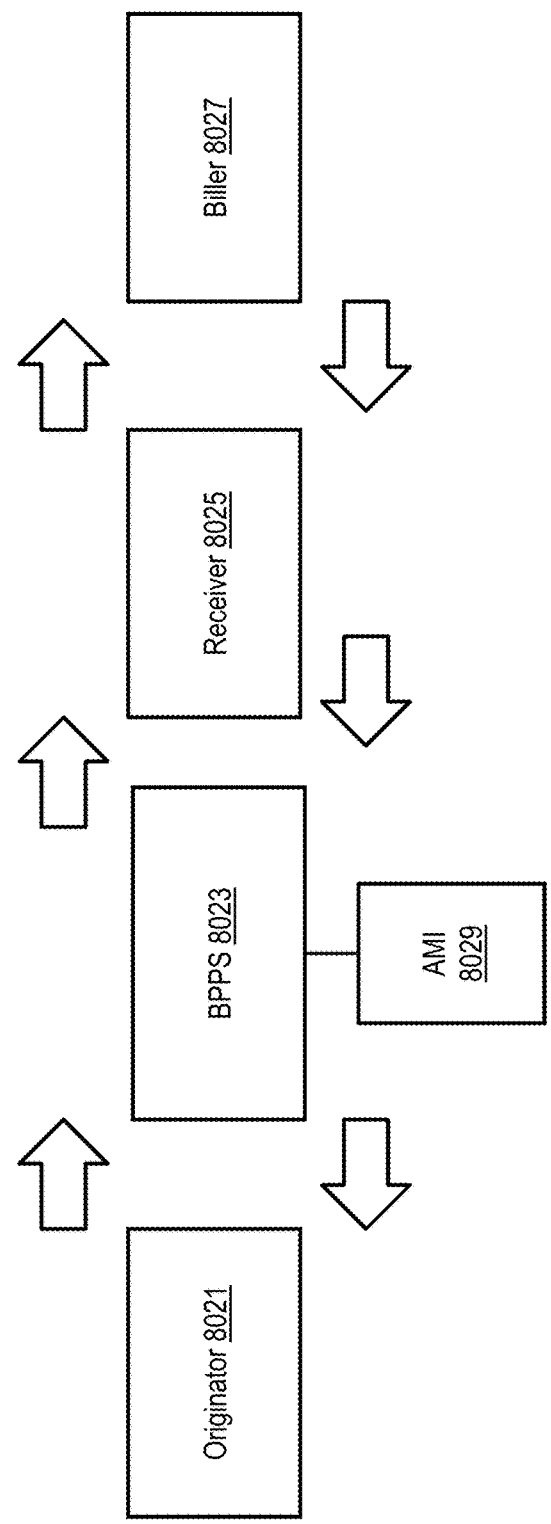
FIG. 11 shows an exemplary scrub file process, in accordance with an aspect of the invention.

FIG. 11 shows an exemplary scrub file process, in accordance with an aspect of the invention; in a non-limiting example, a goal of this process is to verify that corrected account numbers will pass existing account masking. Originator 8021 creates a scrub file spreadsheet per biller; i.e., for each biller 8027. BPPS 8023 facilitates delivery of the spreadsheet to a designated receiver and/or biller contact. Receiver 8025 receives the scrub file and passes it to the biller scrub contact (human or automated system) of biller 8027, who reviews the spreadsheet details and performs queries in the system to identify corrected bill payment instructions (specifically account number) and updates the spreadsheet accordingly. Biller 8027 passes the cleansed scrub file spreadsheet to receiver 8025, which passes same back to directory services of the BPPS 8023. Directory services of the BPPS 8023 runs the corrected cleansed account numbers through the account mask identifier (AMI) tool 8029 to ensure that account masks are established for the given biller 8027. If account masks are missing, directory services of the BPPS 8023 will work with receiver 8025 and/or biller 8027 to establish same. Directory services of the BPPS 8023 then passes the file back to originator 8021. Originator 8021 follows the appropriate policy to update the bill payment system (i.e., their internal bill payment system as opposed to the BPPS) with the correct account information or coordinate changes with the consumer.

Figure 12:
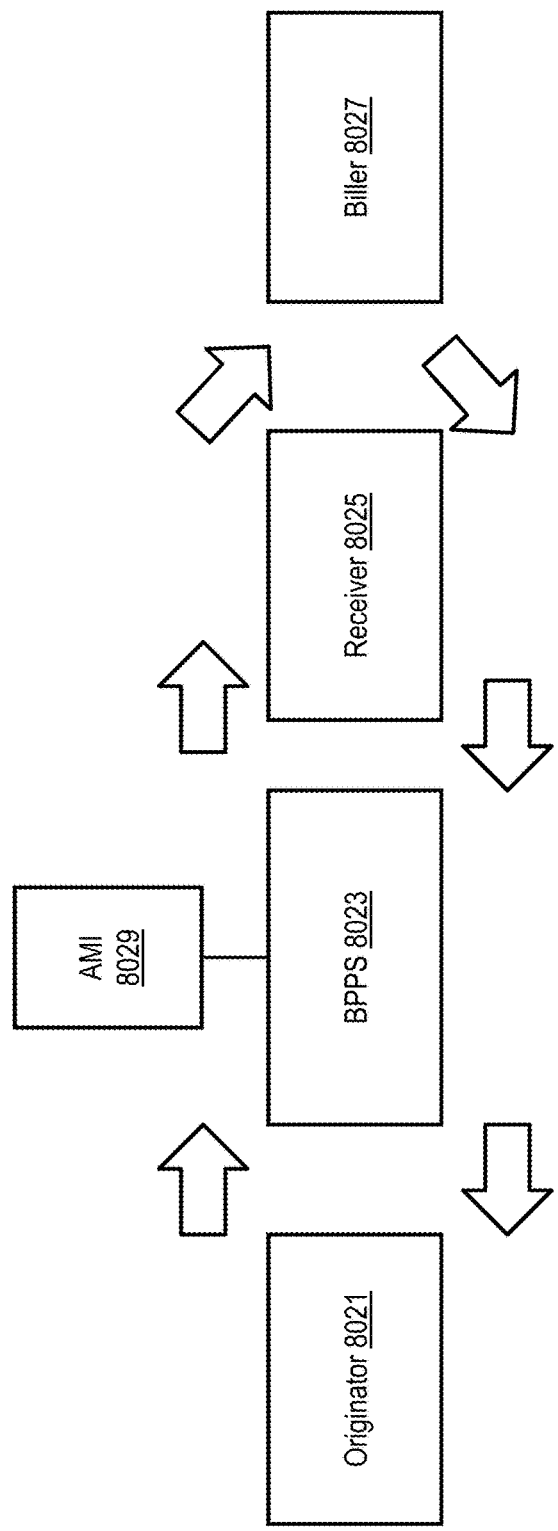
FIG. 12 shows an exemplary optimization framework process, in accordance with an aspect of the invention.

FIG. 12 shows an exemplary optimization framework process, in accordance with an aspect of the invention; in a non-limiting example, a goal of this process is to identify billers that are on the originator's paper biller list. Originator 8021 creates a paper biller list spreadsheet and provides same to BPPS 8023. BPPS 8023 reviews this file manually. BPPS 8023 identifies the biller and runs the account numbers through AMI 8029 to identify recommended account masks. Receiver 8025 determines if the account masks can be added, or else defers this decision to biller 8027. If receiver 8025 defers, Biller 8027 reviews the account masks requested and provides a response. In some cases, receiver 8025 can act independently. Receiver 8025 adds the account masks if same were approved by biller 8027, or else, if they were declined by the biller, passes that response to BPPS 8023. Optionally, BPPS 8023 summarizes the feedback. Originator 8021 updates the (internal) bill payment system according to policy.

Figure 13:
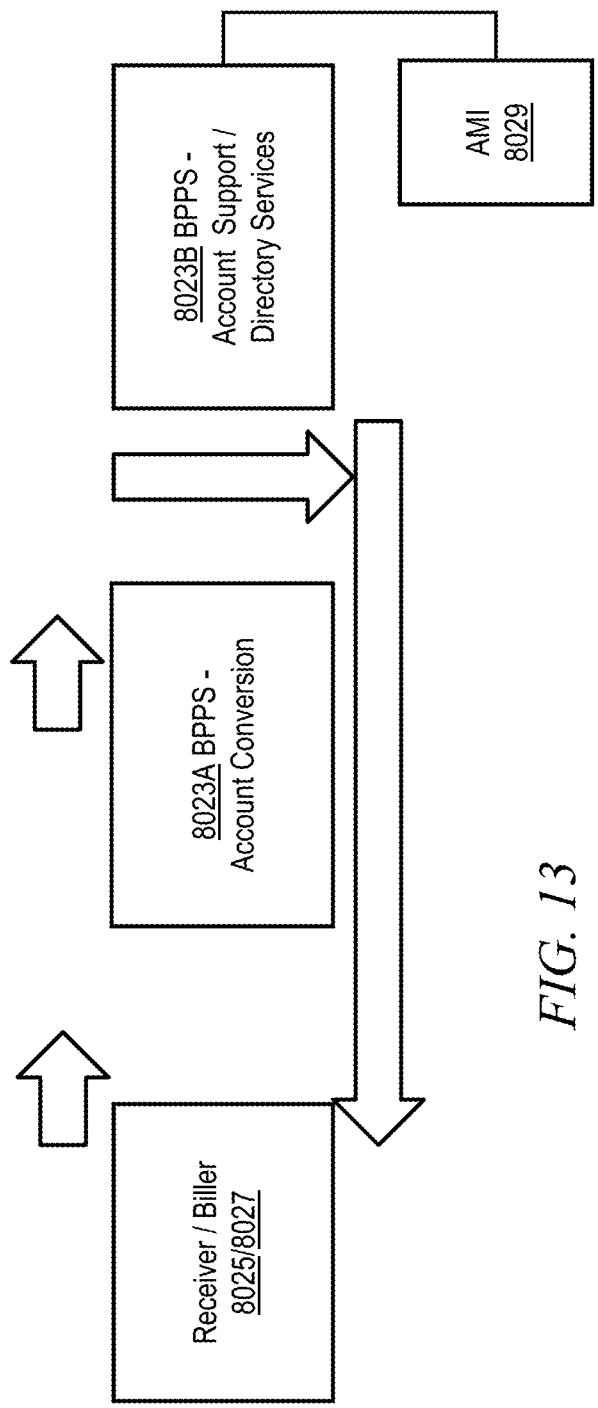
FIG. 13 shows an exemplary account conversion process, in accordance with an aspect of the invention.

FIG. 13 shows an exemplary account conversion process, in accordance with an aspect of the invention; in a non-limiting example, a goal of this process is to identify account masks needed for account numbers that were rejected for failing account masks during the account number load process. Receiver 8025 or biller 8027 creates and provides the account conversion file to BPPS (account conversion functionality) 8023A. BPPS (account conversion functionality) 8023A processes the account conversion file and loads those account numbers that pass edits. BPPS (account support/directory services functionality) 8023B pulls account numbers associated with account mask rejects and runs them through AMI 8029 for the identified biller. BPPS (account support/directory services functionality) 8023B works with receiver 8025, biller 8027, and Directory Services to add account masks. Receiver 8025 or biller 8027 submits the accounts that were rejected. In one or more embodiments, 8023B represents a human team pulling information from 8023A and running same through the tool 8029; in other instances, this process can be automated.

By way of review, significant goals of participants in a BPPS network include increased electronic bill pay rate, decreased use of paper checks, and/or creation of a least cost routing solution for consumer payments. The account mask identifier (AMI) in accordance with one or more embodiments of the invention provides a pattern recognition tool which compares a set of account numbers against existing account masks. If the account number(s) do(es) not pass any of the existing account masks, the tool will identify generic and refined account masks that an entity such as a BPPS operator can recommend adding to the biller's profile(s).

Without having the correct account masks in the biller's profile, the BPPS will not be able to pass the account numbers through the system edits to get them to the biller.

One or more embodiments of the invention are applicable in a variety of contexts. For example, at least some embodiments are helpful to remote banking and credit counseling receivers and/or billers. One or more embodiments include check digit routine validation; the same could optionally be omitted in some instances.

One or more embodiments advantageously provide value for new receivers and/or billers; for example, one or more embodiments:

maximize the number of electronic payments received by allowing new receivers and/or billers to establish preliminary masks for billers not yet live; in at least some embodiments, the AMI tool identifies the count of account numbers that meet the recommended account masks.

reduce post implementation monitoring where the receiver is trying to determine what is not coming through the BPPS (identifying gaps).

save time on manually reviewing accounts to determine mask.

enhance certainty in determining whether all account masks are established.

simplify implementing billers on the biller directory.

Furthermore, one or more embodiments advantageously provide value for existing receivers and/or billers; for example, one or more embodiments:

allow the receiver to easily keep biller profiles updated in the event the receiver and/or biller is/are not actively reviewing the account structure; for example, account loads could be done at the discretion of the receiver and/or biller—in one or more embodiments, the AMI tool compares the account numbers against the existing masks and identifies any additional masks that need to be added, identifies the count of account numbers that meet the recommended account masks, and, if a check digit is in place, determines whether all of the account numbers pass that edit.

provide an easier process for the receivers and/or billers to run versus looking manually at the accounts or looking at check details.

show the receiver the recommended masks to add within a biller directory concentrator admin tool and allow the receiver to submit the update to the directory at that time. In some instances, a work package is created and sent to the biller to review and make a decision on addition of recommended account masks.

Even further, one or more embodiments advantageously provide value for the BPPS operator; for example, one or more embodiments:

support the biller implementation process, making it easier.

provide a helpful support tool that can be employed when customers are going through mergers and/or acquisitions or portfolio sales, whether the customers are adding a new biller or updating an existing biller.

provide a support tool that makes it easier for receivers to actively update the billers' profiles.

provide the BPPS operator insight to all the account data and potential opportunities.

provide an easy way to identify missing account masks.

enhance or even optimize the electronic payment rate across all senders and receivers.

provide insight into opportunities to better serve customers, as the customers themselves can show the operator of the BPPS network what account number formats they want to process through the BPPS network.

provide an easier way to identify potential gaps in the biller directory as the operator of the BPPS network does not need to wait for originators to reach out to them allow the operator of the BPPS network to be more proactive in helping keep biller profiles updated, helping both the originator and receivers identify payments for billers the operator of the BPPS network has on the network that are not processing through the BPPS network but are dropping to paper increase electronic rates positively for one, some, or all participants on the network provide an opportunity for the operator of the BPPS to engage in a consultative role and learn more about the customers' businesses, how the customers use the biller directory, and the current focus of the customers Still further, in one or more embodiments, all participants (from consumer to biller) of the network benefit when an originator leverages this solution; for example, in one or more embodiments, this:

enhances or even optimizes electronic payment volume.

helps reduce costs associated with payments that drop to paper check.

provides a faster posting experience for the consumer when he or she moves from paper to electronic payments enhances customer satisfaction identifies and confirms updates needed in biller profiles, which can be leveraged by BPPS directory services 8023B identifies when an account mask update should occur in order to pass corrected account numbers through the BPPS network as a result of a scrub file provides an additional service that can be packaged for valued customers One or more embodiments are employed in connection with a BPPS that processes only those electronic payments that pass an account mask structure identified by the biller.

Figure 14:
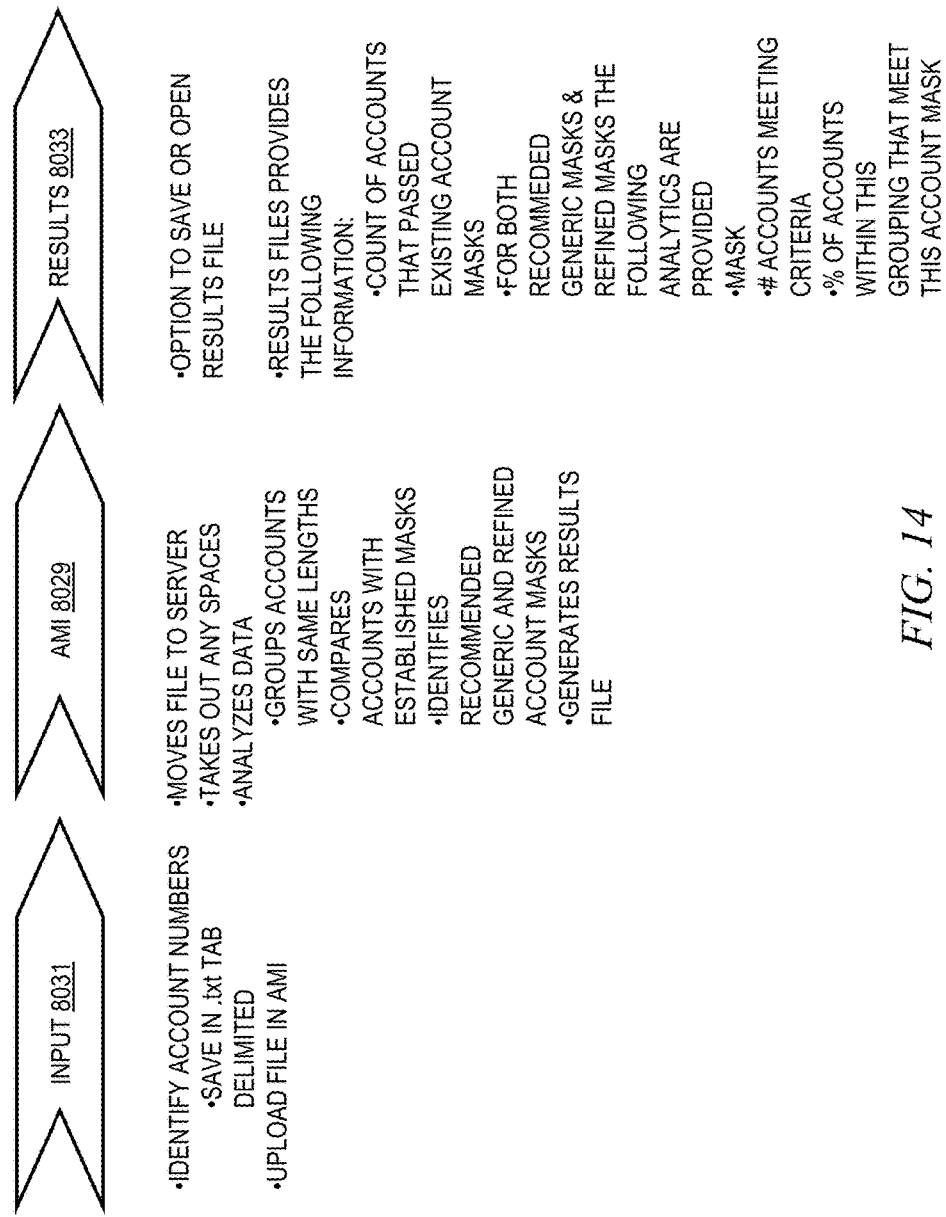
FIG. 14 shows an exemplary process flow, in accordance with an aspect of the invention.

FIG. 14 shows an exemplary process flow, in accordance with an aspect of the invention. The Account Mask Identifier (AMI) 8029 is a pattern recognition application which allows internal staff, originators, receivers or billers to quickly identify account masks that are needed in order to process payments through the BPPS network for either a new or existing biller (in one or more embodiments, based upon account numbers provided). Input 8031 includes identified account numbers; in a non-limiting example, the same are saved in a ".txt" file and are tab delimited, resulting in a .tab file. This file is uploaded to AMI 8029. In a non-limiting exemplary embodiment, up to two Biller IDs are selected. More or fewer could be selected in other embodiments. AMI 8029 moves the file to a suitable server such as 800; this can be the server on which a suitable AMI application, discussed further below, resides. Whether components other than server 800 are involved will depend on the technical solution. If a file is loaded through a UI, it would be moved to a temporary server for processing, provide file results and remove temporary information from the server. AMI 8029 performs any appropriate pre-processing; for example, taking out any spaces. AMI 8029 groups accounts with the same lengths, compares the accounts with established masks, and identifies recommended generic and/or refined account masks. A results file containing same is then generated.

With regard to results 8033, in one or more embodiments, an option is provided to save or open the results file. In a non-limiting example, the results file provides the following information:

count of accounts that passed existing account masks for both recommended generic masks and refined masks, the following analytics are provided in one or more embodiments:

mask number of accounts meeting criteria number of accounts within this grouping that meet this account mask.

If billers know their account structure format across their organization, then they provide same by mapping to the BPPS Biller Directory account masking key. If billers do not know their account structure they take a sample of account numbers and provide the account masking based upon the sample data. Billers will monitor incoming paper payments (checks) to see what the account numbers are and to update if account mask is missing.

As noted, AMI 8029 employs pattern-matching techniques in one or more embodiments. AMI 8029 normalizes the input data; for example, when seeing a number, replace same with a pound (hash) sign or an "at" sign. That is to say, replace actual values in the account number with the appropriate symbol from the table of FIG. 10. Furthermore in this regard, in some cases, in a first round of analysis, all numerals zero through nine are mapped to pound or hash (#) sign, letters a-z uppercase or lowercase are mapped to an "at" (@) sign, dashes are mapped to a literal dash (i.e., not mapped, just retained as a dash), and any other special characters are mapped to an exclamation point (!). In a second round of analysis, the user identifies how many values he or she wants to seek static values (i.e., actual characters not wildcards) for; e.g., for credit cards, the first six characters are the bank identification number (BIN), now known as the Issuer Identification Number (IIN).

The system parses the data, and, based on the type of character present and the definition in the table of FIG. 10, converts the number to the format. The system traverses through every character in an account number and develops the best proposed account mask. Then, for every account the system sees, an aggregation is performed, and an examination is made for the same pattern showing up. For example, if all the account numbers are ten numerical digits, the mask is ten pound or hash signs. Suppose account numbers are seen to have ten or eleven digits . . . some masks are ten pound signs and some masks are eleven pound signs. Thus, in one or more embodiments, interpret and/or parse account number characters and map same into the wild-carded character set in the table of FIG. 10.

Thus, in one or more embodiments, obtain valid account numbers, parse them, and re-render them in accordance with the table of FIG. 10. Then, attempt to develop an account mask that will be valid for all valid account numbers. In one or more embodiments, these steps can be carried out by a server or other general purpose computer 800 which is programmed to implement the logic shown in the flow chart of FIG. 15 and described in the accompanying text below.

In one or more embodiments, to move from parsed valid accounts with substituted wildcards to one or more recommended account masks, employ a counter. Store every unique value. In a non-limiting example, there might be one thousand accounts with five unique rendered values; the first of these unique rendered values may show up six hundred times, the next three hundred times, the next fifty times, the next twenty five times, and the next twenty times. Accordingly, some embodiments store a unique string based on the rendered version of the account number and then count the number of times each unique string is found in the entire sample of valid account numbers. In the example, there may thus be five recommended mask structures. In other embodiments, this might be trimmed down to the top three (or other pre-determined number), for example.

By way of review and provision of additional detail, in input stage 8031, with regard to the file format, if data comes, for example, from EXCEL, remove all data except the account number; leave same in column A. Format the account number column (A) so that it is 'text'. Save the file as a text file (tab delimited), with one account number on each line (row). If account numbers are received in an Excel® spreadsheet (registered mark of Microsoft Corporation, Redmond, Wash., USA) or the like, it should be ensured that the account number column is formatted to text and the account number is in column A.

In one or more embodiments, the biller IDs are provided in ascending order (e.g., in the output file and/or in other intermediate data structures or displays) and the user can scroll through the list to pick his or her biller ID. Other approaches can be used in other embodiments. In at least some instances, the AMI tool 8029 will allow the user to select more than two biller IDs; in some cases, more or fewer can be selected; and in some cases there might not be a biller ID existing if a new biller is being set up. Furthermore, in at least some cases, the tool provides two tables, namely, an active biller table and a pending biller table. Active billers include those that are currently live. Pending billers include changes that have been saved but not yet submitted; for example, to anticipate future changes that will take place or billers that will be added/active in the future.

With regard to AMI tool 8029, in some instances, the following approach to identifying account masks is employed.

For generic masks, group all accounts with the same length, assign patterns not existing today, group and count, and use a literal value for alpha and special characters.

For refined masks, run accounts twice. In the first iteration, encode the entire string. In a second iteration, afford the user an opportunity to restore literal values to one or more characters.

In one or more embodiments, performance is dependant upon the following information: the number of accounts in the file, and the number of account masks in the biller's profile.

In at least some embodiments, logic is initially case in-sensitive; then, when changing one or more characters back to their literal values, case-sensitivity is again significant.

With regard to results 8033, in at least some cases, all the potential refined account masks will be displayed. Because the number may be large, in at least some cases, it will be helpful focus on the refined masks with the higher percentages. Also displayed will be the recommended account mask(s), the number of accounts that meet each refined mask, and the percentage of accounts within that group ranking. If there is a special character or alpha numeric character that is repeated in the refined account masks, the result will display the literal value (i.e., actual character not wild-carded) that is repeatable. Purely by way of non-limiting examples, the results file can be viewed in the UltraEdit® text editor available from IDM Computer Solutions, Inc., Hamilton, Ohio, USA, or can be imported via EXCEL or the like.

FIGS. 3A-3C present a sample output file. In the example, there is a "%" after each account mask recommended. The account numbers are 'grouped' by length and for that grouping, the tool populates the percentage of account numbers for that group ranking. In other words, the percentage indicates how many account numbers for that new mask are within the specific account length.

In another non-limiting example, the output file includes the following information:

Tab 1—Summary Results
  Identify Biller ID (if existing).
  Identify Participant RPPS ID (if Biller ID is existing).
  Identify recommended account masks (refined and generic). Show count of account numbers that would pass the recommended account masking.
  Identify count of account matches to existing account masks.

Tab 2—Details—Only Shows Accounts that do NOT Map to an Existing Account Mask
  Identify account number and recommended account mask One or more embodiments have a number of different uses. For example, with regard to implementing new receivers and/or new billers, if a receiver has difficulty identifying the account masks needed for its account numbers, an entity such as an operator of a BPPS can offer to take a sample file of valid account numbers and can run same through the tool 8029 and can then provide generic and/or refined account mask recommendations. As discussed elsewhere, at least some embodiments can be employed in connection with Account Conversion Technology (ACT)/Stop File. As receivers and/or billers are testing the file format, if any records are rejected due to an invalid account mask, the ACT inbound file can be exported and the accounts can be run against the appropriate biller IDs to identify needed account masks.

Furthermore, some embodiments can be leveraged to automate manual processes performed today when consulting for a customer or doing internal research. In some current systems, biller cleansed scrub files are reviewed manually to verify that corrected account numbers will pass account masks. One or more embodiments can be utilized to take the list of corrected account numbers and run same through the tool 8029 to validate or identify needed account masks.

Furthermore, one or more embodiments provide an optimization framework wherein account numbers from the originator's paper payments are examined to determine if there are a high number of account masks missing for a given biller.

Still another application of one or more embodiments arises with regard to a Remote Banking and Credit counseling biller comparison process, wherein it is desired to validate that CC (credit counseling) payment and CC DMP (debt management proposal) biller profiles are synchronized. In addition, a comparison for RB (remote banking) and CC in some instances needs to be done as well. One or more embodiments help to automate that process. For example, compare two existing biller profile masks to validate if all account masks are in place.

In some cases, an entity such as an operator of a BPPS can proactively reach out to billers who have not made any updates since they have gone live; the BPPS operator can offer to examine accounts to make sure they are not missing any account masks. Furthermore, in some cases, an entity such as an operator of a BPPS can proactively reach out to billers to see if the billers want to provide account numbers for the operator of the BPPS to review to ensure that account masking is established; indeed, it is desirable to ensure that both generic and refined account masks are being set up for originators that desire both.

In another exemplary application, a customer may not want to receive a certain range of account numbers. Those account numbers can be run through AMI tool 8029 to determine if the account masks could be refined to prevent those account numbers from passing through the system.

Furthermore, one or more embodiments provide an automated method of identifying account masks needed for processing payments electronically through a BPPS. One or more embodiments provide an account mask legend key. Some embodiments provide a user interface (UI) so the technology is self-service and allows creation of a work package to submit an update to the biller's profile.

Recapitulation

Figure 15:
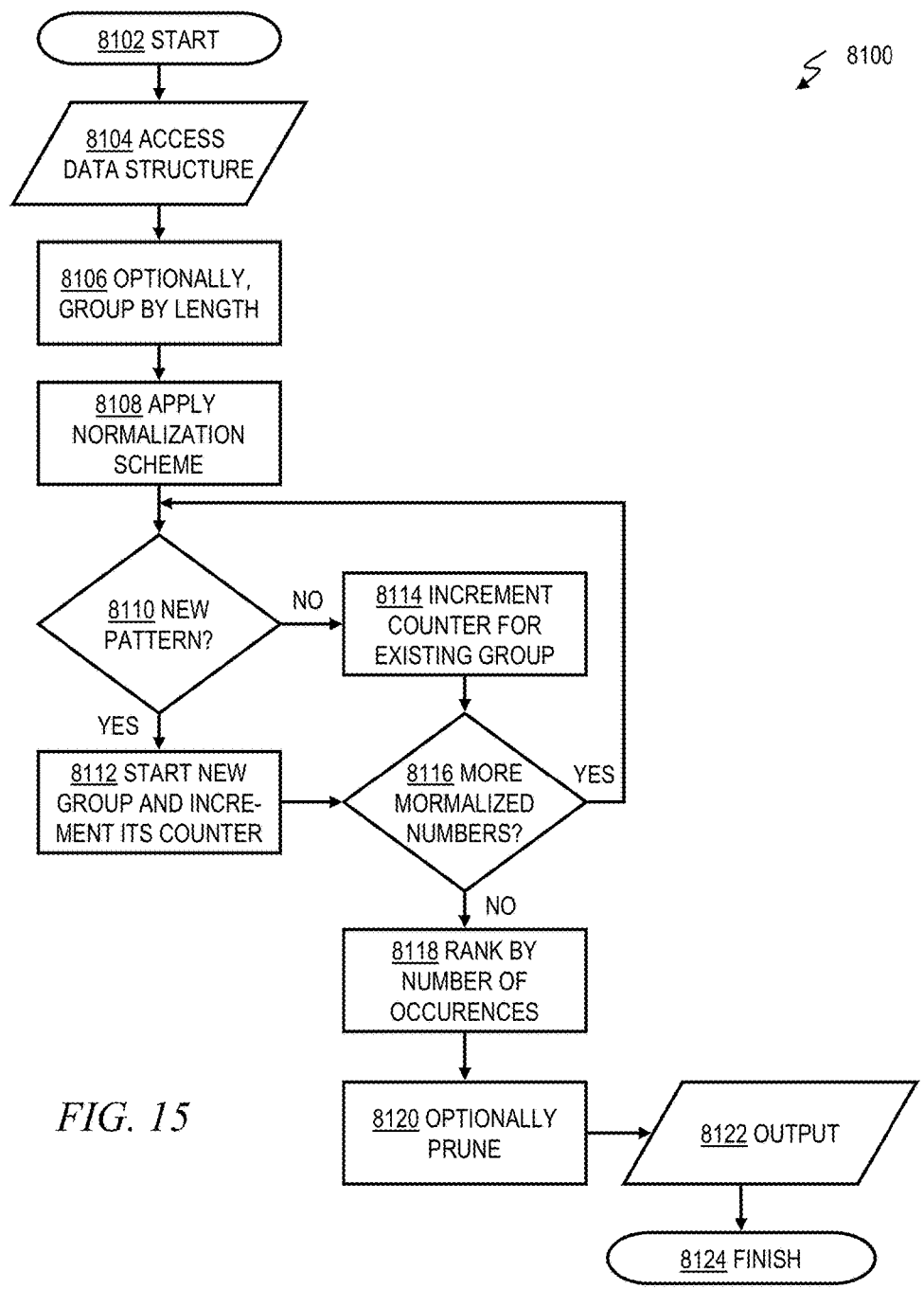
FIG. 15 is a flow chart of logic implemented by an account mask identifier tool, in accordance with an aspect of the invention.

Given the discussion thus far, and with reference now to flow chart 8100 of FIG. 15, which begins at 8102, it will be appreciated, in general terms, an exemplary method, according to one aspect of the invention, includes the step 8104 of obtaining access to a data structure. The data structure includes a plurality of valid customer account numbers for customers of a biller 8027 that utilizes or desires to utilize the electronic bill presentment and payment system. In some instances, access is obtained at a computing device (e.g., 800) located in communication with an intermediate node in an electronic bill presentment and payment system. For example, in FIG. 1, element 1006 is labeled as the electronic bill payment system, but it can be thought of as an intermediate node in the overall view 1000, which itself constitutes a larger system. Thus, the computing device could be within a system 1006 in FIG. 1, as shown at 8029 in FIG. 1.

In a non-limiting example, the tool 8029 can reside within a biller directory tool maintained by the operator of the system 1006, and can be exposed as an API (e.g., to the other parties) or made available as a web service.

The following is a non-limiting exemplary data structure:

TABLE I

A12345B1D
AB1234567C
E67890S2W
Q12321XYZ
N11233217D
NQ1233333X
AA1231232J
X12343XYZ
M12312DEF
N98765DEG
N98766D2E
BB1231232N
CC1231232J
CA1231222P
J98888DDD
AC1298765P
A71299999G
DD9998765P
CC1298888H
AA1222222W

A further step 8108 includes replacing each character (every character may not be replaced with a wild card in every embodiment—for example, as noted, in some cases a limited number of characters such as the dash or hyphen are retained in their literal form; thus, in some instances, every alphanumeric character is replaced, at least in a first phase or iteration, but not every special character) of each of the valid customer account numbers with a wild card in accordance with a normalization scheme (e.g., that of the table of FIG. 10 or other examples set forth herein), to obtain a plurality of normalized valid customer account numbers. In the context of the claims and this portion of the discussion, a wild card is any character that substitutes for more than one other character; with this definition, the *, #, @, and ! symbols in FIG. 10 are all wild cards. Some characters might not be wild-carded (e.g., dashes). Furthermore, as discussed elsewhere herein, in some cases, wild cards are again replaced with the literal characters. This step could be carried out with the aforementioned computing device; for example, running AMI tool 8029. An even further step includes designating at least one pattern of the wild cards in the plurality of normalized valid customer account numbers as a recommended account mask, which can, for example, be output in step 8122. The flow chart ends at 8124.

The following shows the normalized values, normalized in accordance with a normalization scheme wherein numerals are mapped to a pound or hash sign, upper or lower case letters are mapped to an at sign, a dash is not mapped but is rather retained literally, and any other special characters are mapped to an exclamation point; for convenience, these are shown in the second column with the original values in the first column:

TABLE II

| A12345B1D | @#####@#@ |
| AB1234567C | @@#######@ |
| E67890S2W | @#####@#@ |
| Q12321XYZ | @#####@@@ |
| N11233217D | @########@ |
| NQ1233333X | @@#######@ |
| AA1231232J | @@#######@ |
| X12343XYZ | @#####@@@ |
| M12312DEF | @#####@@@ |
| N98765DEG | @#####@@@ |
| N98766D2E | @#####@#@ |
| BB1231232N | @@#######@ |
| CC1231232J | @@#######@ |
| CA1231222P | @@#######@ |
| J98888DDD | @#####@@@ |
| AC1298765P | @@#######@ |
| A71299999G | @########@ |
| DD9998765P | @@#######@ |
| CC1298888H | @@#######@ |
| AA1222222W | @@#######@ |

As an aside, note that other schemes could be chosen in other embodiments; for example, where more than one wildcard from the table of FIG. 10 could be used, in the initial mapping, the most specific wildcard could be chosen, that is, * could be used for uppercase alphabetical characters and # is used for numerals; with @ not yet employed.

An optional step 8106, which can be carried out in some cases, includes grouping those of the plurality of valid customer account numbers having the same length together.

The following table shows customer account numbers having the same length grouped together:

TABLE III

A12345B1D
E67890S2W
Q12321XYZ
X12343XYZ
M12312DEF
N98765DEG
N98766D2E
J98888DDD
AB1234567C
N11233217D
NQ1233333X

TABLE III-continued

AA1231232J
BB1231232N
CC1231232J
CA1231222P
AC1298765P
A71299999G
DD9998765P
CC1298888H
AA1222222W

In some cases, the designating step includes identifying a plurality of recurring patterns of the wild cards in the plurality of normalized valid customer account numbers (in a non-limiting example, via steps 8110-8116, discussed below); ranking the plurality of recurring patterns of wild cards in the plurality of normalized valid customer account numbers in accordance with the number of occurrences thereof, as per step 8118; and designating at least the most frequently occurring one of the plurality of recurring patterns of wild cards in the plurality of normalized valid customer account numbers as the recommended account mask.

For example, in decision block 8110, examine the first pattern and determine whether it is a new pattern (of necessity, the first pattern is a new pattern). In Table II, the first pattern is @#####@#@. Since this is a new pattern, follow the "YES" branch to step 8112, start a new group (e.g. Group 1), and increment the counter for Group 1 (i.e., Group 1 has 1 element). Proceed to decision block 8116. Since there are more normalized numbers, follow the "YES" branch back to decision block 8110 and analyze the next pattern, @@#######@. Since this is a new pattern as well, start a new group in step 8112, say Group 2, and increment its counter, i.e., Group 2 now has one element. Again, go back to decision block 8110 and analyze the next pattern, namely, @#####@#@. This is the same as the first pattern, so it is not a new pattern. Follow the "NO" branch of block 8110 to step 8114 and increment the counter of Group 1 to indicate that it now has two elements. Continue with this logical flow until the whole of Table II has been traversed, i.e., there are no more normalized numbers, following the "NO" branch of block 8116 to step 8118.

Then, in step 8118, rank by the number of occurrences. In the example of Table II, this will result in the following:

TABLE IV

| Group Number | Pattern | Number of Elements |
|---|---|---|
| II | @@#######@ | 10 |
| III | @#####@@@ | 5 |
| I | @#####@#@ | 3 |
| IV | @########@ | 2 |

In some cases, all the recurring patterns are recommended as account masks, such that an additional step includes designating all remaining ones of the plurality of recurring patterns of wild cards in the plurality of normalized valid customer account numbers as additional recommended account masks. In the example, designate @#####@#@, @@#######@, @#####@@@, and @########@ as account masks. On the other hand, in some cases, optional pruning step 8120 is carried out, such that only a predetermined number of remaining ones of the plurality of recurring patterns of wild cards in the plurality of normalized valid customer account numbers are designated as additional recommended account masks. For example, if the predetermined number was two, only @@#######@ and @#####@@@ are recommended as account masks. Other pruning techniques could be employed. For example, Groups with less than a predetermined number of elements could be discarded. Suppose such predetermined umber was three. Then, only @@#######@, @#####@@@, and @#####@#@ are recommended as account masks.

In another aspect, in some cases, an additional step includes determining whether at least two of the recurring patterns of wild cards in the plurality of normalized valid customer account numbers can be collapsed to a single pattern by using a broader wild card. For example, suppose in the initial mapping, the account numbers had uppercase letters and numerals, all the uppercase letters were mapped to *, and all the numerals were mapped to #. Suppose further that this initial mapping yielded **#### and *### as account masks. These could be collapsed to **@### in this example where the @ is used in the fifth position to cover an uppercase alpha or numeric.

Furthermore, as discussed elsewhere herein, in some instances, and additional step includes re-literalizing some of the wildcards in at least some of the patterns, as described elsewhere herein.

Note that the computing device does not necessarily have to be at or in communication with the intermediate node in the bill payment system. It could be located at one of the other parties.

Also contemplated are computer program products that carry out any one, some, or all of the method steps and/or apparatuses that carry out any one, some, or all of the method steps; for example, general purpose computers including processor(s) and memory wherein software modules described herein, when loaded into the memory, configure the processor(s) to implement any one, some, or all of the method steps described.

System and Article of Manufacture Details

Embodiments of the invention can employ hardware and/or hardware and software aspects. Software includes but is not limited to firmware, resident software, microcode, etc. Firmware provides a number of basic functions (e.g., display, print, accept keystrokes) that in themselves do not provide the final end-use application, but rather are building blocks; software links the building blocks together to deliver a usable solution.

Figure 7:
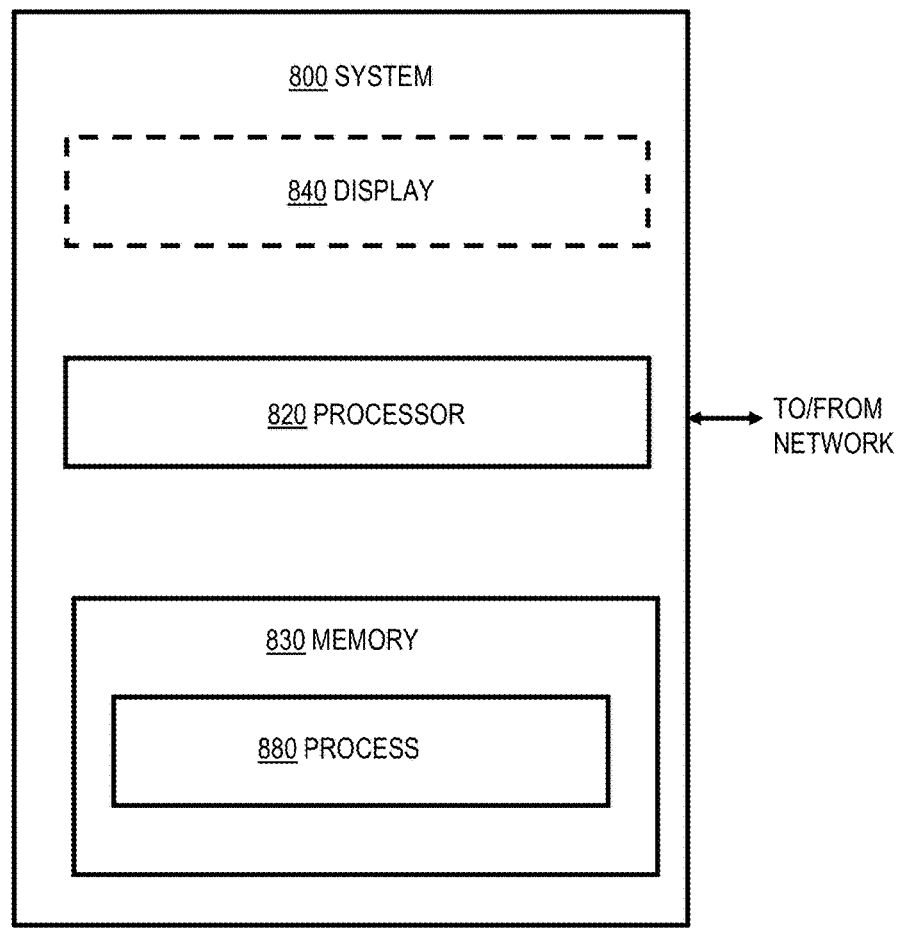
FIG. 7 is a block diagram of an exemplary computer system useful in one or more embodiments of the invention.

FIG. 7 is a block diagram of a system 800 that can implement part or all of one or more aspects or processes of the invention. As shown in FIG. 7, memory 830 configures the processor 820 (which could correspond, e.g., to servers implementing one or more tools or other aspects, or processors associated with any entities as depicted in the figures, and the like) to implement one or more aspects of the methods, steps, and functions disclosed herein (collectively, shown as process 880 in FIG. 7). Different method steps can be performed by different processors. The memory 830 could be distributed or local and the processor 820 could be distributed or singular. The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined to exclude a transmission medium or disembodied signal. Such a tangible computer-readable recordable storage medium is non-transitory.

The computer systems and servers described herein each contain a memory that will configure associated processors to implement the methods, steps, and functions disclosed herein. Such methods, steps, and functions can be carried out, e.g., by processing capability on the various elements, platforms, and so on, processors associated with any entities as depicted in the figures, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention can make use of computer technology with appropriate instructions to implement method steps described herein.

Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable storage medium. Further, one or more embodiments of the invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 7) running a server program. It will be understood that such a physical server may or may not include a display, keyboard, or other input/output components. A "host" includes a physical data processing system (for example, system 800 as shown in FIG. 7) running an appropriate program. Servers or hosts may run business intelligence/analysis software, database software, security software, communications software, or any other suitable type of software mentioned herein.

Figure 16:
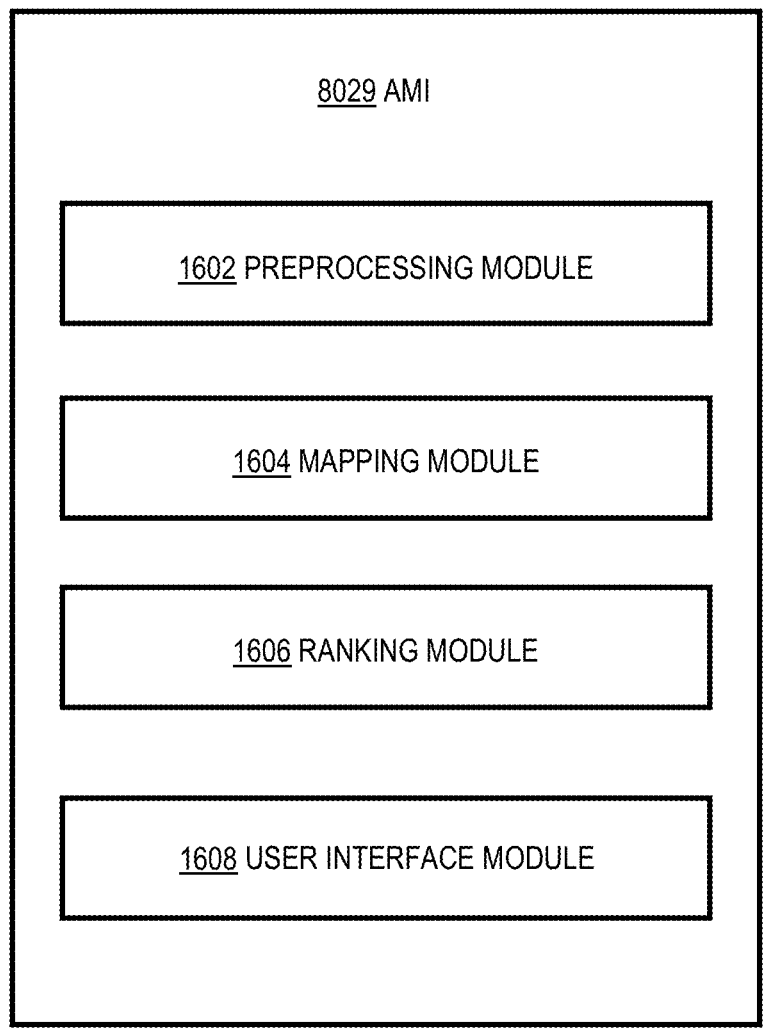
FIG. 16 is a software architecture diagram, in accordance with an aspect of the invention.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. Referring to FIG. 16, in some instances, the modules include a preprocessing module 1602, a mapping module 1604, a ranking module 1606, and a user interface or other input/output module 1608. These modules could be stored on a non-transitory medium and loaded into memory to configure the processor 820 to provide the required functionality and to form at least a portion of account mask identifier (AMI) tool 8029. In a non-limiting example, at least some of the modules could be written in the Perl scripting language. The pre-processing module carries out space and character filling. The mapping module carries out step 8108. The ranking module carries out steps 8110-8118; for example, by using an associative array for each pattern; starting a new array for new patterns and incrementing the counter for existing patterns. Steps 8120, 8122 can be facilitated with a user interface module; in a non-limiting example, it employs html code to communicate with a user via a browser. Suitable integration with a workflow management tool can be provided in some instances. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Note also that the step of accessing the data structure can be carried out in a number of different fashions; for example, with a database program or via suitable input output (e.g., read and write) statements in a programming language.

Thus, aspects of the invention can be implemented, for example, by one or more appropriately programmed general purpose computers, such as, for example, servers or personal computers, located at one or more of the entities in the figures, as well as within the payment network and/or payment system. Such computers can be interconnected, for example, by one or more of payment network 2008, another VPN, the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list; see discussion of other programs herein), and can also make use of, for example, Extensible Markup Language (XML), a suitable scripting language such as Perl, known application programs such as relational database applications, spreadsheets, and the like. The computers can be programmed to implement the logic and/or data flow depicted in the figures.

In at least some instances, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   at a computing device located in communication with an intermediate node in an electronic bill payment system, obtaining access to a data structure comprising a plurality of valid customer account numbers;
   with said computing device, obtaining a plurality of normalized valid customer account numbers by replacing each character of each of said valid customer account numbers with a wild card in accordance with a normalization scheme;
   designating at least one pattern of said wild cards in said plurality of normalized valid customer account numbers as a recommended account mask;
   processing, with said electronic bill payment system, at least one electronic payment with an account number that passes said recommended account mask; and
   rejecting, with said electronic bill payment system, at least one electronic payment with an account number that does not fit said recommended account mask.

2. The method of claim 1, further comprising grouping those of said plurality of valid customer account numbers having a same length together.

3. The method of claim 1, further comprising:
   identifying a plurality of recurring patterns of said wild cards in said plurality of normalized valid customer account numbers;
   ranking said plurality of recurring patterns of said wild cards in said plurality of normalized valid customer account numbers in accordance with a number of occurrences thereof; and
   designating at least a most frequently occurring one of said plurality of recurring patterns of said wild cards in said plurality of normalized valid customer account numbers as a recommended account mask.

4. The method of claim 3, further comprising designating all remaining ones of said plurality of recurring patterns of said wild cards in said plurality of normalized valid customer account numbers as additional recommended account masks.

5. The method of claim 3, further comprising designating only a predetermined number of remaining ones of said plurality of recurring patterns of said wild cards in said plurality of normalized valid customer account numbers as additional recommended account masks.

6. The method of claim 3, further comprising determining whether at least two of said recurring patterns of said wild cards in said plurality of normalized valid customer account numbers can be collapsed to a single pattern by using a broader wild card.

7. The method of claim 1, further comprising providing a system, wherein the system comprises distinct software modules, each of the distinct software modules being embodied on a non-transitory computer-readable storage medium, and wherein the distinct software modules comprise a mapping module and a ranking module;
   wherein:
   said replacing is carried out by said mapping module executing on at least one hardware processor of said computing device;
   said designating is carried out by said ranking module executing on said at least one hardware processor of said computing device.

8. A method comprising the steps of:
   at a computing device, obtaining access to a data structure comprising a plurality of valid customer account numbers;
   with said computing device, obtaining a plurality of normalized valid customer account numbers by replacing each character of each of said valid customer account numbers with a wild card in accordance with a normalization scheme;
   designating at least one pattern of said wild cards in said plurality of normalized valid customer account numbers as a recommended account mask;
   processing, with an electronic bill payment system, at least one electronic payment with an account number that passes said recommended account mask; and
   rejecting, with said electronic bill payment system, at least one electronic payment with an account number that does not fit said recommended account mask.

9. The method of claim 8, further comprising providing a system, wherein the system comprises distinct software modules, each of the distinct software modules being embodied on a non-transitory computer-readable storage medium, and wherein the distinct software modules comprise a mapping module and a ranking module;
   wherein:
   said replacing is carried out by said mapping module executing on at least one hardware processor of said computing device;
   said designating is carried out by said ranking module executing on said at least one hardware processor of said computing device.

10. A system located in communication with an intermediate node in an electronic bill payment system, said system comprising:
    a memory;
    at least one processor operatively coupled to said memory; and
    a persistent storage device operatively coupled to said memory and storing in a non-transitory manner instructions which when loaded into said memory cause said at least one processor to be operative to:
    obtain access to a data structure comprising a plurality of valid customer account numbers for customers of a biller that utilizes or desires to utilize said electronic bill payment system;
    obtain a plurality of normalized valid customer account numbers by replacing each character of each of said valid customer account numbers with a wild card in accordance with a normalization scheme;

designate at least one pattern of said wild cards in said plurality of normalized valid customer account numbers as a recommended account mask;

process, with said electronic bill payment system, at least one electronic payment with an account number that passes said recommended account mask; and reject, with said electronic bill payment system, at least one electronic payment with an account number that does not fit said recommended account mask.

11. The system of claim 10, wherein said persistent storage device further stores in a non-transitory manner instructions which when loaded into said memory cause said at least one processor to be operative to group those of said plurality of valid customer account numbers having a same length together.

12. The system of claim 10, wherein said instructions which when loaded into said memory cause said at least one processor to be operative to designate said at least one pattern of said wild cards in said plurality of normalized valid customer account numbers as said recommended account mask comprise:

instructions which when loaded into said memory cause said at least one processor to be operative to identify a plurality of recurring patterns of said wild cards in said plurality of normalized valid customer account numbers;

instructions which when loaded into said memory cause said at least one processor to be operative to rank said plurality of recurring patterns of said wild cards in said plurality of normalized valid customer account numbers in accordance with a number of occurrences thereof; and instructions which when loaded into said memory cause said at least one processor to be operative to designate at least a most frequently occurring one of said plurality of recurring patterns of said wild cards in said plurality of normalized valid customer account numbers as said recommended account mask.

13. The system of claim 12, wherein said persistent storage device further stores in a non-transitory manner instructions which when loaded into said memory cause said at least one processor to be operative to designate all remaining ones of said plurality of recurring patterns of said wild cards in said plurality of normalized valid customer account numbers as additional recommended account masks.

14. The system of claim 12, wherein said persistent storage device further stores in a non-transitory manner instructions which when loaded into said memory cause said at least one processor to be operative to designate only a predetermined number of remaining ones of said plurality of recurring patterns of said wild cards in said plurality of normalized valid customer account numbers as additional recommended account masks.

15. The system of claim 12, wherein said persistent storage device further stores in a non-transitory manner instructions which when loaded into said memory cause said at least one processor to be operative to determine whether at least two of said recurring patterns of said wild cards in said plurality of normalized valid customer account numbers can be collapsed to a single pattern by using a broader wild card.

16. The system of claim 10, wherein said instructions on said persistent storage device comprise a plurality of distinct software modules, and wherein said distinct software modules comprise a mapping module and a ranking module; wherein:

said mapping module comprises said instructions which cause said at least one processor to replace each character of each of said valid customer account numbers with said wild card in accordance with said normalization scheme, to obtain said plurality of normalized valid customer account numbers; and said ranking module comprises said instructions which cause said at least one processor to designate said at least one pattern of said wild cards in said plurality of normalized valid customer account numbers as said recommended account mask.

17. An article of manufacture for use at an intermediate node in an electronic bill payment system, said article of manufacture comprising a computer program product, said computer program product in turn comprising:

a tangible computer-readable recordable storage medium, storing in a non-transitory manner computer readable program code which, when loaded into a memory, configures at least one associated processor to be operative to:

obtain access to a data structure comprising a plurality of valid customer account numbers for customers of a biller that utilizes or desires to utilize said electronic bill payment system;

obtain a plurality of normalized valid customer account numbers by replacing each character of each of said valid customer account numbers with a wild card in accordance with a normalization scheme;

designate at least one pattern of said wild cards in said plurality of normalized valid customer account numbers as a recommended account mask;

process, with said electronic bill payment system, at least one electronic payment with an account number that passes said recommended account mask; and reject, with said electronic bill payment system, at least one electronic payment with an account number that does not fit said recommended account mask.

18. An apparatus for use at an intermediate node in an electronic bill payment system, said apparatus comprising:

means for obtaining access to a data structure comprising a plurality of valid customer account numbers;

means for obtaining a plurality of normalized valid customer account numbers by replacing each character of each of said valid customer account numbers with a wild card in accordance with a normalization scheme;

means for designating at least one pattern of said wild cards in said plurality of normalized valid customer account numbers as a recommended account mask;

means for processing, with an electronic bill payment system, at least one electronic payment with an account number that passes said recommended account mask; and means for rejecting, with said electronic bill payment system, at least one electronic payment with an account number that does not fit said recommended account mask.

* * * * *